(12) United States Patent
Abudawoud et al.

(10) Patent No.: US 11,377,609 B2
(45) Date of Patent: *Jul. 5, 2022

(54) SYSTEM AND PROCESS FOR STEAM CRACKING AND PFO TREATMENT INTEGRATING HYDRODEALKYLATION AND NAPHTHA REFORMING

(71) Applicant: Saudi Arabian Oil Company, Dhahran (SA)

(72) Inventors: Raed Abudawoud, Dhahran (SA); Qi Xu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,436

(22) Filed: Oct. 30, 2019

(65) Prior Publication Data

US 2021/0130712 A1    May 6, 2021

(51) Int. Cl.
| | |
|---|---|
| *C10G 69/08* | (2006.01) |
| *B01D 3/14* | (2006.01) |
| *B01J 19/24* | (2006.01) |
| *C10G 69/12* | (2006.01) |

(52) U.S. Cl.
CPC ............. *C10G 69/08* (2013.01); *B01D 3/143* (2013.01); *B01J 19/245* (2013.01); *C10G 69/123* (2013.01); *B01J 2219/0004* (2013.01); *C10G 2300/1044* (2013.01); *C10G 2300/1088* (2013.01); *C10G 2400/30* (2013.01)

(58) Field of Classification Search
CPC ...... C10G 69/14; C10G 69/06; C10G 69/123; C10G 2300/1044; C10G 2300/1096; C10G 2300/4018; C10G 2400/30; C10G 61/04; C10G 35/00
See application file for complete search history.

(56) References Cited

U.S. PATENT DOCUMENTS

| | | | |
|---|---|---|---|
| 3,702,292 A * | 11/1972 | Burich | C10G 9/005 208/80 |
| 4,022,681 A | 5/1977 | Sheng et al. | |
| 4,427,526 A | 1/1984 | Stadelhofer et al. | |

(Continued)

FOREIGN PATENT DOCUMENTS

| | | |
|---|---|---|
| CN | 1478139 A | 2/2004 |
| CN | 101712889 B | 1/2013 |

(Continued)

OTHER PUBLICATIONS

Ristic, Compositional Characterization of Pyrolysis Fuel Oil from Naphtha and Vacuum Gas Oil, 2018, Energy Fuels, 32, 1276-1286. (Year: 2018).*

(Continued)

*Primary Examiner* — Michelle Stein
(74) *Attorney, Agent, or Firm* — Leason Ellis LLP

(57) ABSTRACT

A process for treatment of PFO from a steam cracking zone includes hydrodealkylating PFO or a portion thereof for conversion of polyaromatics compounds contained in the PFO into hydrodealkylated aromatic compounds with one benzene ring, a hydrodealkylated BTX+ stream. In addition, a naphtha reformer is integrated, so that the hydrodealkylated BTX+ stream and a reformate stream are separated into BTX compounds.

21 Claims, 9 Drawing Sheets

(56) References Cited

U.S. PATENT DOCUMENTS

| | | | |
|---|---|---|---|
| 4,765,883 A | 8/1988 | Johnson et al. | |
| 4,940,529 A * | 7/1990 | Beaton | C10G 69/04 208/108 |
| 5,362,382 A * | 11/1994 | Heck | C10G 65/04 208/210 |
| 6,069,286 A | 5/2000 | Wu et al. | |
| 6,171,471 B1 * | 1/2001 | Ferrughelli | C10G 67/0463 208/212 |
| 7,301,063 B2 | 11/2007 | Choi et al. | |
| 7,513,988 B2 | 4/2009 | Oballa et al. | |
| 8,142,645 B2 | 3/2012 | Zhou et al. | |
| 8,921,633 B2 | 12/2014 | Iaccino et al. | |
| 8,940,950 B2 | 1/2015 | Ellrich et al. | |
| 8,975,460 B2 | 3/2015 | Königsmann et al. | |
| 9,061,953 B2 | 6/2015 | Johnson et al. | |
| 9,073,805 B2 | 7/2015 | Frey et al. | |
| 9,228,139 B2 | 1/2016 | Shafi et al. | |
| 9,228,140 B2 | 1/2016 | Abba et al. | |
| 9,228,141 B2 | 1/2016 | Sayed et al. | |
| 9,255,230 B2 | 2/2016 | Shafi et al. | |
| 9,279,088 B2 | 3/2016 | Shafi et al. | |
| 9,284,497 B2 | 3/2016 | Bourane et al. | |
| 9,284,501 B2 | 3/2016 | Sayed et al. | |
| 9,284,502 B2 | 3/2016 | Bourane et al. | |
| 9,296,961 B2 | 3/2016 | Shafi et al. | |
| 9,382,486 B2 | 7/2016 | Bourane et al. | |
| 9,732,013 B2 | 8/2017 | Buchanan et al. | |
| 10,035,742 B1 * | 7/2018 | Xu | C07C 6/126 |
| 10,131,853 B2 | 11/2018 | Pelaez et al. | |
| 10,472,580 B2 | 11/2019 | Al-Ghamdi et al. | |
| 2006/0287561 A1 | 12/2006 | Choi et al. | |
| 2007/0090018 A1 * | 4/2007 | Keusenkothen | B01D 3/009 208/106 |
| 2007/0090020 A1 * | 4/2007 | Buchanan | C10G 45/00 208/106 |
| 2008/0083649 A1 * | 4/2008 | McCoy | C10G 55/04 208/44 |
| 2009/0173666 A1 * | 7/2009 | Zhou | C10G 47/26 208/112 |
| 2009/0272671 A1 * | 11/2009 | Keusenkothen | C10G 69/06 208/44 |
| 2011/0083996 A1 * | 4/2011 | Shafi | C10G 69/06 208/50 |
| 2012/0067776 A1 | 3/2012 | Diehl et al. | |
| 2012/0149958 A1 | 6/2012 | Ellrich et al. | |
| 2013/0210611 A1 | 8/2013 | Kim et al. | |
| 2013/0261365 A1 | 10/2013 | Wang et al. | |
| 2014/0174980 A1 * | 6/2014 | Brown | C10G 45/44 208/15 |
| 2015/0141724 A1 * | 5/2015 | Frey | C10G 45/52 585/319 |
| 2016/0289139 A1 | 10/2016 | Baird et al. | |
| 2016/0289569 A1 | 10/2016 | Baird et al. | |
| 2017/0058210 A1 * | 3/2017 | Pelaez | C10G 69/00 |
| 2017/0355911 A1 | 12/2017 | Koppel et al. | |
| 2018/0155642 A1 | 6/2018 | Al-Ghamdi et al. | |
| 2018/0273857 A1 | 9/2018 | Aramburo et al. | |
| 2018/0273859 A1 | 9/2018 | Frey et al. | |
| 2018/0282638 A1 | 10/2018 | Aramburo et al. | |
| 2018/0334623 A1 | 11/2018 | Funk et al. | |
| 2019/0055479 A1 | 2/2019 | van Kimmenade et al. | |
| 2019/0161683 A1 | 5/2019 | Narayanaswamy et al. | |

FOREIGN PATENT DOCUMENTS

| | | | |
|---|---|---|---|
| CN | 103436288 A | 12/2013 | |
| CN | 103121906 B | 2/2015 | |
| CN | 103121895 B | 6/2015 | |
| CN | 103121896 B | 6/2015 | |
| CN | 104357083 B1 | 8/2016 | |
| KR | 2012078006 A | 1/2012 | |
| KR | 2012078006 A | 7/2012 | |
| KR | 101753664 B1 | 7/2017 | |
| KR | 101791051 B1 | 10/2017 | |
| KR | 101791051 B1 * | 10/2017 | |
| KR | 101815056 B1 | 1/2018 | |
| SU | 277246 A | 8/1967 | |
| SU | 462857 A1 | 3/1975 | |
| SU | 834108 B | 5/1981 | |
| WO | 2015128046 A1 | 9/2015 | |
| WO | 2017093056 A1 | 6/2017 | |
| WO | WO-2018094336 A1 * | 5/2018 | C10G 21/00 |
| WO | 2018127812 A1 | 7/2018 | |

OTHER PUBLICATIONS

"Selective Hydrocracking of Pyrolysis Fuel Oil Into Benzene, Toluene and Xylene Over Como/Beta Zeolite Catalyst;" Upare, Dipali P et al.; Journal of Industrial and Engineering Chemistry, vol. 46, Feb. 25, 2017, pp. 356-363 (Abstract Only).

"Temperature Selective Condensation of Tyre Pyrolysis Oils To Maximise the Recovery of Single Ring Aromatic Compounds;" William, Paul T. et al.; Fuel, vol. 82, Issue 9, Jun. 2003, pp. 1023-1031 (Abstract Only).

"Characterization of Toluene- and Quinoline-Insoluble Extracted From Pyrolysis Fuel Oil-Derived Pitch for Manufacture of C/C Composites;" Kim, Hong G. et al.; International Journal of Precision Engineering and Manufacturing, Jul. 2018, vol. 19, Issue 7, pp. 1033-1037 (Abstract Only).

"Hydrodealkylation of C9+ Heavy Aromatics To BTX Over Zeolite-Supported Nickel Oxide and Molybdenum Oxide Catalysts;" Shen, Qunbing et al.; Catalysis Letters, vol. 129, pp. 170-180 (2009) (Abstract Only).

"Hydrodealkylation of Heavy Aromatics On MOO3/HZSM-5 Catalyst;" Dong, Jiaojiao et al.; Petrochemical Technology, vol. 37, No. 3, 232-7, Mar. 2008 (Abstract Only).

"Morphology Effect of Beta-Zeolite Supports for NI2P Catalysts On the Hydrocracking of Polycyclic Aromatic Hydrocarbons To Benzene, Toluene, and Xylene;" Kim, Yong-Su et al.; Journal of Catalysis, 351:67-78, Jul. 2017 (Abstract Only).

"An Investigation On the Selective Hydrodealkylation of C-9(+) Aromatics Over Alkali-Treated PT/H-ZSM-5 Zeolites;" Kim, Taewoo et al.; Catalysis Science & Technology, 6 (14): 5599-5607, 2016 (Abstract Only).

"Production of Lower Alkenes and Light Fuels By Gas Phase Oxidative Cracking of Heavy Hydrocarbons;" Zhu, Haiou et al.; Fuel Processing Technology, 87 (7): 649-657, Jul. 2006 (Abstract Only).

"APU(SM) Technology for the Production of BTX and LPG From Pyrolysis Gasoline Using Metal Promoted Zeolite Catalyst;" Choi, Sun et al.; Catalysis Surveys From Asia, 10 (2): 110-116 Jun. 2006 (Abstract Only).

"Conversion of Heavy Aromatic Hydrocarbons To Valuable Synthetic Feed for Steamcrackers;" Cesana, Alberto et al.; Oil Gas European Magazine, 34 (2): 89-94, Jun. 2008 (Abstract Only).

"Catalytic Performance of CROX/SIO2 Catalyst for Hydrodealkylation of C10+ Heavy Aromatics;" Shi, DX et al.; Chinese Journal Of Catalysis, 26 (7): 582-586, Jul. 2005 (Abstract Only).

"Heavy Aromatics Upgrading Using Noble Metal Promoted Zeolite Catalyst;" Oh, S.H. et al.; Studies in Surface Science and Catalysis: Impact Of Zeolites And Other Porous Materials On The New Technologies At The Beginning Of The New Millennium, Pts A and B, 142: 887-894 Part A&B, 2002 (Abstract Only).

"(191c) APU, A Novel Technology for Producing High Purity BTX;" Nocca, J. et al.; Conference: 2006 AIChE Spring Meeting and Global Congress on Process Safety, Ethylene Producers Conference, Fundamentals and Technology, Apr. 2006 (Abstract Only).

PCT International Search Report and Written Opinion from corresponding PCT Application No. PCT/US2020/055884 dated Jan. 20, 2021.

PCT International Search Report and Written Opinion from PCT Application No. PCT/US2020/055889 dated Jan. 25, 2021.

\* cited by examiner

SYSTEM AND PROCESS FOR STEAM CRACKING AND PFO TREATMENT INTEGRATING HYDRODEALKYLATION AND NAPHTHA REFORMING

RELATED APPLICATIONS

Not applicable.

BACKGROUND OF THE INVENTION

Field of the Invention

The present disclosure concerns integrated processes and systems to maximize recovery of products including benzene, toluene and xylenes (BTX) from pyrolysis fuel oil (PFO) obtained from a steam cracking unit.

Description of Related Art

Petrochemical refiners are facing issues with utilization of PFO streams obtained from steam cracking. Such steam cracking processes are well known and employ very high temperature, high flow rates and production of large amounts of flammable gases. The overall process conditions are set to maximize useful and valuable chemicals in the steam cracking effluent, the most desirable of which are typically light olefins. Useful and valuable products are also typically obtained from LPG and pyrolysis gasoline, commonly referred to as pygas or py-gas.

The heaviest portion of the steam cracking effluents is commonly referred to as pyrolysis oil, pyrolysis fuel oil (PFO) stream, py-oil or pyoil, which is a C9+ stream that contains C9+ paraffins, monoaromatics, naphtheno-monoaromatics, diaromatics, naphtheno-diaromatics, and poly-aromatics.

In steam cracking operations in which ethane or propane are used as the feedstock, the product is mainly ethene, with other products including methane, propene, butadiene, and py-gas, with relatively small quantity of PFO being produced. In steam cracking operations in which naphtha is used as feedstock, in addition to the light olefin products, the yields of both py-gas and PFO are relatively higher as compared to ethane or propane cracking. The PFO from naphtha cracking contains C9+ paraffins, monoaromatics including BTX components, naphtheno-monoaromatics, diaromatics, naphtheno-diaromatics, and to some extent poly-aromatics with more than three aromatic rings. A typical PFO from steam cracking of naphtha can be further processed conventionally, for example for naphthalene extraction or for production of carbon black (see Ristic et al., *Compositional Characterization of Pyrolysis Fuel Oil from Naphtha and Vacuum Gas Oil, Energy Fuels*, 2018, 32 (2), pp 1276-1286). Table 1 below shows an example of the chemical compositions of PFO streams obtained from the steam cracking of naphtha and the steam cracking of VGO, according to the data disclosed in in Ristic et al., *Compositional Characterization of Pyrolysis Fuel Oil from Naphtha and Vacuum Gas Oil, Energy & Fuels* 32(2)•January 2018 (1276-1286), Table 6.

TABLE 1

| Compound name | PFO from naphtha cracking (wt %) | PFO from VGO cracking (wt %) |
| --- | --- | --- |
| naphthalene | 12.5 | 3.8 |
| 1-methylnaphthalene | 2.1 | 2.2 |
| 2-methylnaphthalene | 3.7 | 3.3 |

TABLE 1-continued

| Compound name | PFO from naphtha cracking (wt %) | PFO from VGO cracking (wt %) |
| --- | --- | --- |
| acenaphthene | 0.4 | 0.2 |
| acenaphthylene | 1.7 | 1.0 |
| fluorene | 1.1 | 1.0 |
| phenanthrene | 1.6 | 1.4 |
| anthracene | 0.3 | 0.4 |
| fluoranthene | 0.1 | 0.2 |
| pyrene | 0.4 | 0.3 |
| chrysene | 0.1 | 0.1 |

In contrast, with steam cracking of heavier feedstocks, the PFO that is produced contains a much higher quantity of poly-aromatics having three or more aromatic rings. For instance, in certain embodiments, PFO from steam cracking of heavy feedstocks contains at least about 20, 30, 40, 50, or 60 wt % of poly-aromatics having three or more aromatic rings. The below Table 2 shows an example of the chemical composition of a PFO stream obtained from hydroprocessing of Arab light crude oil and steam cracking of a fraction having heavy components separated, for instance cut at 540° C., from the hydroprocessed crude oil, for example, according to the process described in U.S. Pat. No. 9,255,230. This PFO, referred to herein as a "refractory" PFO from the steam cracking of treated crude oil or other treated heavy oil feeds, includes over 40 wt % of poly-aromatics having three or more aromatic rings, which include triaromatics, naphtheno-triaromatics, tetraaromatics, penta-aromatics and heavier poly-aromatics including asphaltenes and coke. These excessive quantities of heavier poly-aromatics are uncommon in PFO from naphtha steam cracking. In addition to the di-aromatics and tri-aromatics, the PFO also contains tetra-aromatics, penta-aromatics and heavier poly-aromatics in concentrations that exceed those from naphtha steam cracking.

TABLE 2

| Compounds | wt % |
| --- | --- |
| Paraffin (C9+) | 0.64 |
| Monoaromatics | 1.81 |
| Naphtheno-monoaromatics | 3.2 |
| Diaromatics | 20.26 |
| Naphtheno-diaromatics | 9.83 |
| Triaromatics | 9.59 |
| Naphtheno-triaromatics | 7.26 |
| Tetraaromatics | 5.14 |
| Penta-aromatics | 2.04 |
| Other heavier polyaromatics | 40.23 |
| Total | 100 |

Typically, the PFO stream is a rejected stream at the bottom of the steam cracking effluent separator. The PFO stream contains various poly-aromatics including styrene, naphthene, anthracene, bi-phenyl, and also having poly-aromatics with three or more aromatic in higher concentrations in refractory PFO compared to PFO obtained from naphtha cracking. Conventionally, PFO streams from naphtha cracking and also from cracking of heavier feeds are used and/or valued as fuel oil blending components. For instance, in economic evaluations, PFO is valued as a low sulfur fuel oil stream, which is a considerable discount compared to aromatic hydrocarbons including benzene, toluene and mixed xylenes (BTX), or benzene, toluene, ethylbenzene and mixed xylenes (BTEX).

Therefore, a need exists for improved processes and systems for treatment of PFO streams to maximize recovery of BTX or BTEX compounds.

SUMMARY OF THE INVENTION

The above objects and further advantages are provided by the system and process for treatment of refractory PFO from steam cracking of treated crude oil or other treated heavy oil feeds, which comprises at least 40 wt % of polyaromatics having three or more aromatic rings including triaromatics, naphtheno-triaromatics, tetraaromatics, penta-aromatics and heavier poly-aromatics including asphaltenes and coke.

In certain embodiments, a process for treatment of PFO from a steam cracking zone comprises optionally separating the PFO into at least a first stream containing C9+ aromatics compounds with one benzene ring and C10+ aromatic compounds, and a second stream containing C20+ polyaromatic compounds. All or a portion of the PFO, or all or a portion of the first stream containing C9+ aromatics compounds with one benzene ring and C10+ aromatic compounds, are reacted using catalysts and conditions, including hydrogen, effective for conversion of polyaromatics compounds contained in the PFO into aromatic compounds with one benzene ring, selective ring opening, and dealkylation, to produce reaction effluent including LPG and a hydrodealkylated BTX+ stream. LPG is separated from the reaction effluent. A naphtha feed is subjected to catalytic reforming to produce a reformate stream. At least a portion of the hydrodealkylated BTX+ stream and at least a portion of the reformate stream are separated into BTX compounds.

In certain embodiments, a system for treatment of PFO from a steam cracking zone comprises an optional PFO separation zone having one or more inlets in fluid communication with the steam cracking zone, one or more outlets for discharging a fraction of the PFO including C9+ aromatics compounds with one benzene ring and C10+ aromatic compounds, and one or more outlets for discharging a fraction of the PFO including containing C20+ polyaromatic compounds. A hydrodealkylation zone includes one or more inlets in fluid communication with the steam cracking zone to receive PFO or the first outlet of the PFO separation zone to receive C9+ aromatics compounds with one benzene ring and C10+ aromatic compounds from the PFO, and hydrogen, and one or more outlets for discharging reaction effluent including LPG and hydrodealkylated BTX+ compounds. A separation zone includes one or more inlets in fluid communication with the one or more outlets of the hydrodealkylation zone, one or more outlets for discharging LPG, and one or more outlets for discharging hydrodealkylated BTX+ compounds. A catalytic reforming zone includes one or more inlets in fluid communication with a source of naphtha feed and one or more outlets for discharging a reformate stream. A BTX splitting zone includes one or more inlets in fluid communication with the one or more outlets of the hydrodealkylation zone for discharging reaction effluent including hydrodealkylated BTX+ compounds and the one or more outlets of the catalytic reforming zone for discharging the reformate stream, and one or more outlets for discharging BTX compounds.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings, and where.

DETAILED DESCRIPTION OF THE INVENTION

Figure 1:
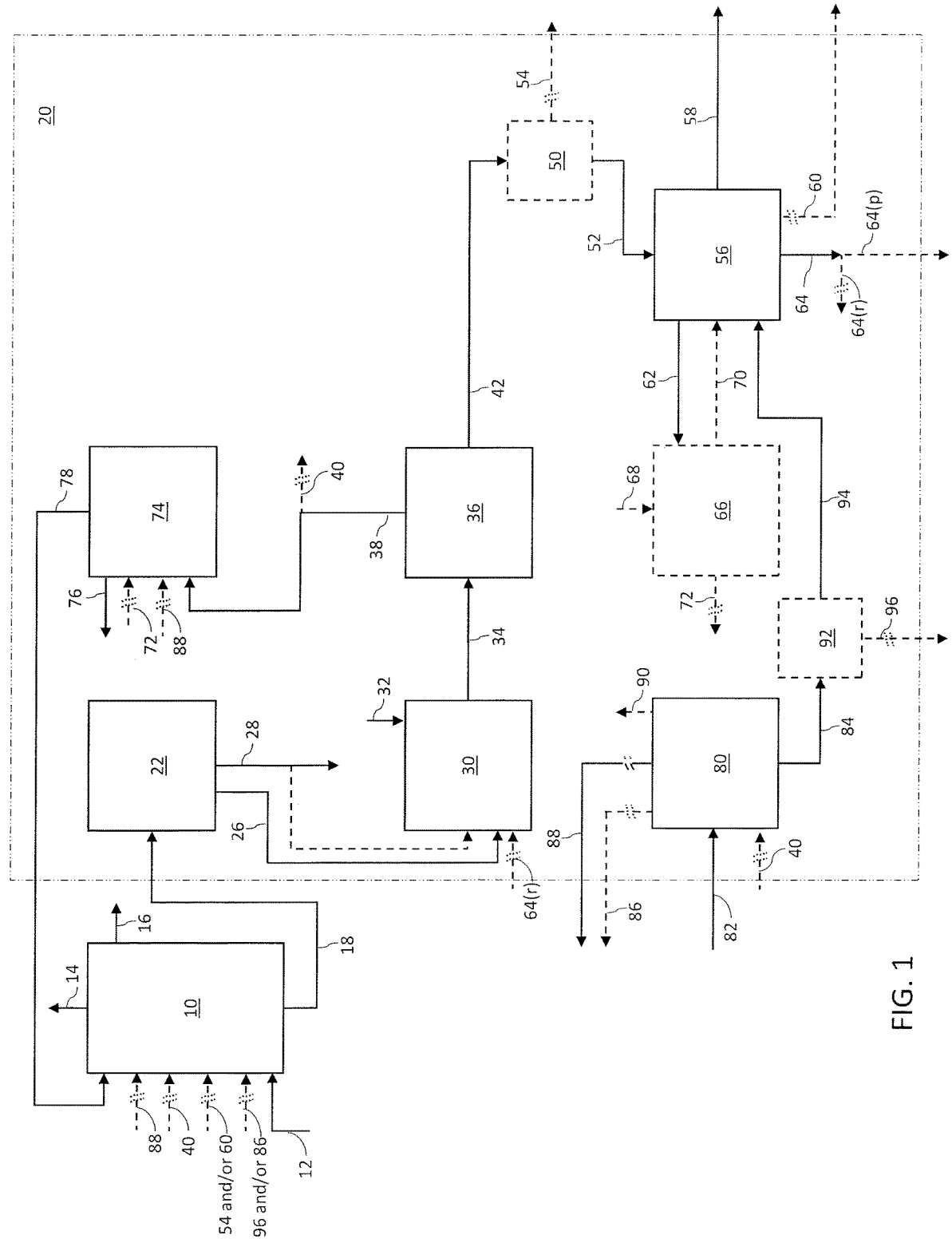
FIG. 1 is a process flow diagram of an embodiment of an integrated system including steam cracking and naphtha reforming, and including treatment of light PFO by hydrodealkylation to produce BTX.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include any crude oil produced worldwide. Examples are Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pretreatment such as water-oil separation; and/or gas-oil separation; and/or desalting; and/or stabilization. In certain embodiments, crude oil refers to any of such mixtures having an API gravity (ASTM D287 standard), of greater than or equal to about 10°, 20°, 30°, 32°, 34°, 36°, 38°, 40°, 42° or 44°.

The term "C# hydrocarbons" or "C #", is used herein having its well-known meaning, that is, wherein "#" is an integer value, and means hydrocarbons having that value of carbon atoms. The term "C #+ hydrocarbons" or "C #+" refers to hydrocarbons having that value or more carbon atoms. The term "C #− hydrocarbons" or "C #−" refers to hydrocarbons having that value or less carbon atoms. Similarly, ranges are also set forth, for instance, C1-C3 means a mixture comprising C1, C2 and C3. When "C #", "C #+" or "C #−" are used in conjunction with "aromatics" they represent one-ring aromatics, diaromatics and/or other polyaromatics having that value of carbon atoms, that value or more carbon atoms, or that value or less carbon atoms. As used herein in describing mixed hydrocarbon streams, "C #" is not intended to represent a sharp cut-off but rather are used for convenience to describe the carbon number of a major portion of said stream. For example, a "C5" stream generally contains a major portion of C5 components and a minor portion of C4 and C6 components.

The term "petrochemicals" or "petrochemical products" refers to chemical products derived from crude oil that are not used as fuels. Petrochemical products include olefins and aromatics that are used as a basic feedstock for producing chemicals and polymers. Typical olefinic petrochemical products include, but are not limited to, ethylene, propylene, butadiene, butylene-1, isobutylene, isoprene, cyclopentadiene and styrene. Typical aromatic petrochemical products include, but are not limited to, benzene, toluene, xylene, and ethyl benzene.

The term "olefin" is used herein having its well-known meaning, that is, unsaturated hydrocarbons containing at least one carbon-carbon double bond. In plural, the term "olefins" means a mixture comprising two or more unsaturated hydrocarbons containing at least one carbon-carbon double bond. In certain embodiments, the term "olefins" relates to a mixture comprising two or more of ethylene, propylene, butadiene, butylene-1, isobutylene, isoprene and cyclopentadiene.

The term "BTX" as used herein refers to the well-known acronym for benzene, toluene and xylenes.

The acronym "LPG" as used herein refers to the well-known acronym for the term "liquefied petroleum gas," and generally is a mixture of C3-C4 hydrocarbons. In certain embodiments, these are also referred to as "light ends."

The term "naphtha" as used herein refers to hydrocarbons boiling in the range of about 20-205, 20-193, 20-190, 20-180, 20-170, 32-205, 32-193, 32-190, 32-180, 32-170, 36-205, 36-193, 36-190, 36-180 or 36-170° C.

The term "light naphtha" as used herein refers to hydrocarbons boiling in the range of about 20-110, 20-100, 20-90, 20-88, 32-110, 32-100, 32-90, 32-88, 32-80, 36-110, 36-100, 36-90, 36-88 or 36-80° C.

The term "heavy naphtha" as used herein refers to hydrocarbons boiling in the range of about 80-205, 80-193, 80-190, 80-180, 80-170, 88-205, 88-193, 88-190, 88-180, 88-170, 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C.

In certain embodiments naphtha, light naphtha and/or heavy naphtha refer to such petroleum fractions obtained by crude oil distillation, or distillation of intermediate refinery processes as described herein.

The terms "pyrolysis gasoline" and its abbreviated form "py-gas" are used herein having their well-known meaning, that is, thermal cracking products generally including aromatic, olefinic and paraffinic hydrocarbons in the range of C5s to C9s or even including C10, C11 and even some C12 hydrocarbons, for instance having an end boiling point in the range of about 170-210 or 170-215° C.

The terms "pyrolysis oil" and its abbreviated form "py-oil," and "pyrolysis fuel oil" and its abbreviated form "PFO," are used herein having their well-known meaning, that is, a heavy oil fraction, C9+, that is derived from steam cracking.

The terms "light pyrolysis oil" and its acronym "LPO" as used herein in certain embodiments refer to pyrolysis oil having an end boiling point of about 340, 360, 380 or 400° C.

The terms "heavy pyrolysis oil" and its acronym "HPO" as used herein in certain embodiments refer to pyrolysis oil having an initial boiling point of about 340, 360, 380 or 400° C.

The terms "reformate" or "chemical reformate" as used herein refer to a mixture of hydrocarbons that are rich in aromatics, and are intermediate products in the production of chemicals and/or gasoline, and include hydrocarbons boiling in the range of about 30-200, 40-200, 30-185, 40-185, 30-170 or 40-170° C.

The embodiments herein include processes and systems that integrate steam cracking with treatment of the PFO obtained from such steam cracking operations. The steam cracking feedstock can be selected from a treated crude oil stream and other treated heavy oil streams such as those in the atmospheric gas oil range, atmospheric residue range, vacuum gas oil range and/or vacuum residue range. The steam cracking feed is treated prior to steam cracking by hydroprocessing/hydrotreating and/or solvent deasphalting. The rejected PFO bottoms stream from the steam cracking unit contains large amount of polyaromatics (for example, with polyaromatics having an average molecular weight that varies between about 150 to 300 kg/kmol and higher), and is conventionally recovered as PFO for use as a fuel oil component. In the process disclosed herein, the PFO obtained from steam cracking of treated crude oil or other treated heavy oil feed is referred to as "refractory PFO." This refractory PFO contains a very high amount of polyaromatics, for instance, at least about 20, 30, 40, 50, or 60 wt % of poly-aromatics having three or more aromatic rings, and total poly-aromatics composition of at least about 50, 60, 70, 80, 90, or 94 wt %. The PFO is considered "refractory" due to its high content of polyaromatics hydrocarbons and heavier molecular weight components.

Refractory PFO is used as feedstock to produce additional BTX/BTEX, and co-produced LPG is recycled to the steam cracking zone as additional feed. BTX/BTEX production and refractory PFO treatment are integrated to minimize loss of aromatics to a fuel oil stream and maximize steam cracking feed. Overall operation efficiencies of steam cracking processes are increased. By converting the polyaromatics into useful chemical building blocks BTX/BTEX rather than combusting them as part of fuel oil, additional higher value products can be obtained from the integrated processes and systems herein. Further, co-produced LPG, and in certain embodiments naphtha-range byproducts, serve as additional steam cracker feed. These co-produced components can be introduced before hydroprocessing of the initial feed, before steam cracking of the hydroprocessed feed, or within the steam cracking. In certain operations, co-produced LPG, and in certain embodiments naphtha-range byproducts components, can pass to a pyrolysis section combined with heated hydroprocessed feed from a convection section of a steam cracking unit so that the light components bypass the convection section. In certain operations, co-produced LPG, and in certain embodiments naphtha-range byproducts components can pass to the convection section with the feed to the steam cracking unit. Integration of a naphtha reformer provides $H_2$ production and additional feed for BTX splitting, so that the overall process dynamics are improved.

Figure 2:
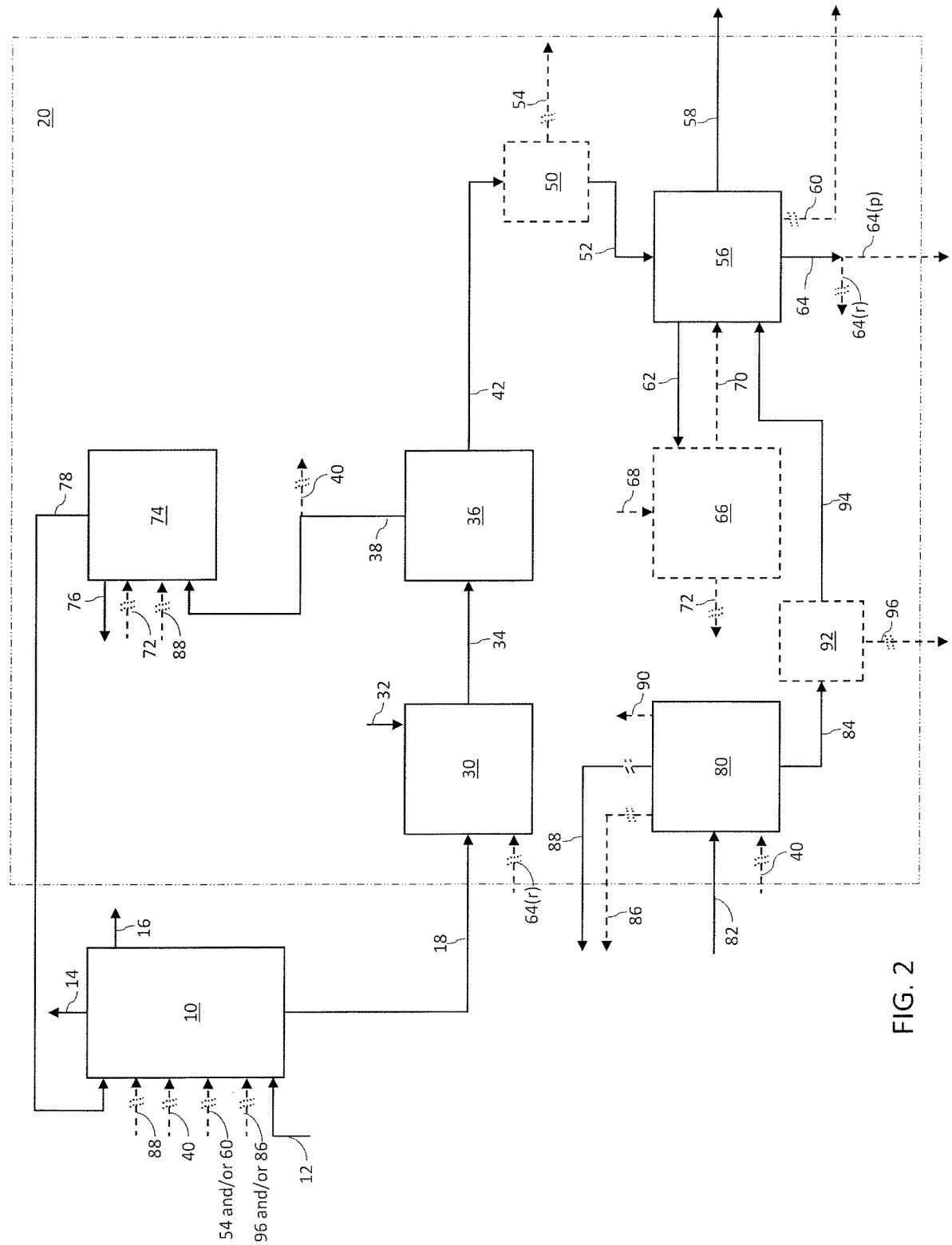
FIG. 2 is a process flow diagram of an embodiment of an integrated system including steam cracking and naphtha reforming, and including treatment of PFO by hydrodealkylation to produce BTX.

FIGS. 1 and 2 are process flow diagrams of embodiments of integrated steam cracking processes and systems including refractory PFO treatment. The systems generally include a steam cracker/separation zone 10; a PFO treatment zone 20 including a hydrodealkylation zone 30, a separation zone 36 and a BTX splitting zone 56; a gas treatment zone 74; and a reforming zone 80. In certain embodiments, a transalkylation zone 66 is also integrated in the PFO treatment zone 20. In the embodiment of FIG. 1 the PFO treatment zone 20 also includes a refractory PFO separation zone 22.

The steam cracking reaction and separation zone is schematically shown at 10. The steam cracking reaction and separation zone includes heaters, furnaces, separation vessels and auxiliary units for steam cracking of an initial steam cracking feed 12 and recycle streams (including LPG and in certain embodiments one or more naphtha streams) created during one or more PFO treatment steps disclosed herein, for production of one or more mixed hydrocarbon product streams, and for separation generally into light gases, olefins, pygas and PFO. The steam cracking reaction separation occurs as is commonly known, for instance, using primary fractionating, quench separation and olefins recovery to generally obtain one or more C2, C3 and/or C4 olefins streams 14, a pygas (C5-C9 range) stream 16 and a PFO (C9+) stream 18. In operations in which the steam cracker is operable to treat an initial stream 12 including or consisting of treated crude oil and/or heavy feedstocks, a refractory PFO stream 18 is produced that is processed in accordance with embodiments described herein.

In the embodiments of FIG. 1, the steam cracking reaction and separation zone 10 is in fluid communication with the separation zone 22 to separate the PFO stream 18 into a first stream 26 containing C9+ aromatics compounds with one benzene ring and C10+ aromatics compounds with no less than 2 and up to 6 (typically between 2 and 4) benzene rings, and a second stream 28 containing heavy C20+ polyaromatics such as those having 6 or more benzene rings (a "poly C20+" stream). In certain embodiments, a substantial portion, a significant portion or a major portion of PFO stream 18 produced from the steam cracking zone 10 is passed to the separation zone 22. The separation zone 22 can include one or more flash vessels and/or one or more simple or fractional distillation columns. Recovered streams from the separation zone 22 include the first stream 26 containing hydrocarbons having a lower limit in the range of about 130-150° C. and an upper limit in the range of about 350-430, for instance, about 130-430, 140-430, 150-430, 130-400, 140-400, 150-400, 130-375, 140-375, 150-375, 130-350, 140-350 or 150-350° C., and the second stream 28 containing hydrocarbons boiling above about the range of about 350-430, for instance above about 350, 375, 400 or 430° C.

The separation zone 22 is in fluid communication with the hydrodealkylation zone 30 to pass all or a portion of the first stream 26. In certain embodiments, a substantial portion, a significant portion or a major portion of the first stream 26 is passed from the separation zone 22 to the hydrodealkylation zone 30. In certain embodiments, the separation zone 22 is in fluid communication with a fuel oil pool or the initial feed treatment zone upstream of the steam cracker to pass all or a portion of the poly C20+ stream 28 (also referred to as a heavy PFO poly C20+ stream) for processing outside of the integrated system, for instance in a fuel oil blending step (not shown), or as a recycle stream to the initial feed treatment zone. In certain embodiments, all, a substantial portion, a significant portion or a major portion of the poly C20+ stream 28 is recycled to the initial feed treatment zone upstream of the steam cracker.

In certain embodiments, with reference to FIG. 2, the separation zone 22 shown in FIG. 1 is not used, so that all or a portion of the full range of the C9+ PFO stream 18 is sent to the hydrodealkylation zone 30. In certain embodiments, a substantial portion, a significant portion or a major portion of the full range of the C9+ PFO stream 18 is routed to the hydrodealkylation zone 30.

The hydrodealkylation zone 30 is in fluid communication with stream 26, stream 26 and all or a portion of stream 28, or stream 18. The hydrodealkylation zone 30 contains one or more reactors in series or parallel arrangement operating under conditions effective for, and using catalyst effective for, selective hydrogenation and selective hydrocracking of the polyaromatics compounds contained in stream 26, stream 26 and all or a portion of stream 28, or stream 18. A hydrogen stream 32 is in fluid communication with the reactor(s) at one or more locations as is known, and can be derived from recycled hydrogen from the integrated steam cracking unit (not shown in FIGS. 1 and 2), produced hydrogen 76 from the gas treatment zone 74, and hydrogen 90 from the reforming zone 80. A make-up hydrogen stream from another source (not shown) can also be in fluid communication with the reactor(s) at one or more locations as is known. Reaction conditions are set in the hydrodealkylation zone 30 to (a) maximize the conversion of polyaromatics, such as naphthalene, methylnaphthalene, anthracene, naphtheno-diaromatics (three rings, one saturated and two aromatic), by selective hydrogenation into aromatic compounds with one benzene ring, and (b) selective ring opening functions and hydrodealkylation functions, targeting aromatic compounds with one benzene ring, to maximize the selective ring opening (preserving the aromatic ring structure) into benzene, toluene, and xylenes (BTX), and/or ethylbenzene.

The catalysts used in the hydrodealkylation zone 30 can include multiple beds of different functional catalysts, multiple reactors of different functional catalysts, a mixture of different functional catalysts in a reactor, or multi-functional catalysts in a reactor. In certain embodiments, selective hydrogenation catalysts used in the hydrodealkylation zone 30 can be, for instance, an acid or metal catalyst, and in certain embodiments dual functionality catalyst materials or a combination of catalyst materials having different functionalities of cracking and hydrogenation. In certain embodiments, selective hydrocracking catalysts used in the hydrodealkylation zone 30 can be selective ring opening and hydrodealkylation catalysts. In certain embodiments, a combined catalysts material can be used that includes functionalities for selective hydrogenation and selective hydrocracking, for instance, with different active components deposited or otherwise incorporated on a support material.

The effluent product stream 34 containing BTX and other generally heavier components is sent to the separation zone 36 for separation of the light gases, stream 38 including LPG and $H_2$, from the remainder effluent product stream 34 containing of the BTX+ components, a hydrodealkylated stream 42. In certain embodiments, the separation zone 36 can be a fractionator associated with the hydrodealkylation reactor which operates similarly to a fractionator conventionally used in conjunction with a hydroprocessing zone. The LPG/$H_2$ stream 38 is passed to the gas treatment zone 74. The effluent product stream 34 having a light gas stream 38 removed, the BTX+ stream 42, is routed to the BTX splitting zone 56 for separation.

Conditions and catalysts are selected in the hydrodealkylation zone 30 to minimize production of non-aromatic naphtha range products, and any naphtha including light naphtha in the effluent product stream 34 can be passed to the BTX splitting zone 56. In operations in which appreciable naphtha is formed, it can be passed to the steam cracking zone 10 as additional feed, or it can be passed to the reforming zone 80 as all or a portion of a reformer naphtha feed stream 82. In further embodiments, any naphtha can be optionally separated separation zone 36, shown in dashed lines as stream 40, that is in fluid communication with the steam cracking zone 10 and/or the reforming zone 80.

In certain embodiments, all or some of the gas treatment steps for the LPG/H$_2$ stream 38 is accomplished by a separate gas treatment zone 74 as shown, or alternatively with other gas treatment operations. In certain embodiments, recovered hydrogen 76 is passed to hydrogen users in the integrated process and system. In certain embodiments, an LPG stream 78 obtained from stream 38 (as shown via the gas treatment zone 74) is passed to the steam cracker as additional feed (not shown). In other embodiments, the light gas stream 38 can be routed to gas treatment operations associated with the steam cracking and separation zone and/or gas treatment operations within a hydroprocessing unit used for treatment of the initial feed upstream of the steam cracking zone (not shown).

In certain optional embodiments (shown in dashed lines), the separated effluent hydrodealkylated BTX+ stream 42 can be passed to an aromatics separation unit 50, whereby an aromatics rich stream 52 (typically an extract stream) is passed to the BTX splitting zone 56, and an aromatics lean stream 54 (typically a raffinate stream) which can include C5 and non-aromatic C6 components (light wild naphtha) is separately processed. In certain embodiments, all, a substantial portion, a significant portion or a major portion of the aromatics lean stream 54 is recycled to the steam cracking zone 10.

The feed to the BTX splitting zone 56 also includes a reformer BTX stream 84 from the reforming zone 80. A naphtha stream 82 is processed in the reforming zone 80 as is known for production of aromatics (BTX and other C8+ aromatics in a reformer BTX stream 84), a by-products LPG stream 88, and a hydrogen stream 90. In the integrated process and system herein, the LPG stream 88 is routed to the gas treatment zone 74 and/or directly to the steam cracker/separation zone 10, and the reformer BTX stream 84 containing BTX and other C8+ aromatic compounds is routed to the BTX splitting zone 56 for separation. Hydrogen 90 can be routed to the hydrogen users in the integrated process and system.

In certain optional embodiments (shown in dashed lines), the reforming zone 80 is operable to remove at least a portion of non-aromatic content from the reaction products, for instance by including an aromatics extraction step within the reformer process, and an aromatics lean stream 86 (typically a raffinate stream) which can include non-aromatic naphtha range components is separately processed. In certain embodiments, all, a substantial portion, a significant portion or a major portion of the aromatics lean stream 86 is recycled to the steam cracking zone 10.

In other optional embodiments (shown in dashed lines), the reformer products stream 84 can be passed to an aromatics separation unit 92, whereby an aromatics rich stream 94 (typically an extract stream) is passed to the BTX splitting zone 56, and an aromatics lean stream 96 (typically a raffinate stream), which can include C5 and non-aromatic C6 components (light wild naphtha), is separately processed. In certain embodiments, all, a substantial portion, a significant portion or a major portion of the aromatics lean stream 96 is recycled to the steam cracking zone 10. Note that while the aromatics separation unit 92 and the aromatics separation unit 50 are shown as separate units, in certain embodiments these can be combined as a common unit.

The BTX splitting zone 56 separates the hydrodealkylated BTX+ stream 42 from the hydrodealkylation zone 30 (via separator 36) into a BTX product stream 58, which can be one or more streams that are typically passed to a BTX complex (not shown) for separation into C6, C7 and C8 streams, benzene, toluene and one more xylene products (BTX), and in certain embodiments benzene, toluene, one more xylene products and ethylbenzene (BTXE). The BTX splitting zone 56 can include one or more simple or fractional distillation columns. In addition, the reforming zone 80 is integrated so that the reformate stream rich in BTX, stream 84, is also routed to the BTX splitting zone 56 for separation.

In certain optional embodiments (shown in dashed lines), the BTX splitting zone 56 is operable to remove at least a portion of non-aromatic content from the hydrodealkylated BTX+ stream 42, for instance by including an aromatics extraction step, and an aromatics lean stream 60 (typically a raffinate stream) which can include non-aromatic components, including C5 and non-aromatic C6 components (light wild naphtha), is recovered and separately processed. In certain embodiments, all, a substantial portion, a significant portion or a major portion of the aromatics lean stream 60 is recycled to the steam cracking zone 10.

In other optional embodiments the aromatics separation unit 50 is included upstream of the BTX splitting zone 56 for removing the aromatics lean stream 54 containing non-aromatic components from the feeds to the BTX splitting zone 56, including C5 and non-aromatic C6 components (light wild naphtha), and the aromatics rich stream 52 is passed to the BTX splitting zone 56.

In certain embodiments, a C9 stream 62 is recovered, which includes trimethyl-benzene, methylethylbenzene, and other C9 compounds. In additional embodiments, the C9 stream 62 is passed to a transalkylation zone 66 to further produce BTX via transalkylation reactions, shown as a BTX stream 70.

A heavy product stream 64 from the BTX splitting zone 56 (a C10+ fraction) can be purged as stream 64(p) and used, for instance, as fuel oil, recycled back to the hydrodealkylation zone 30 for further conversion as stream 64(r), recycled to the initial feed treatment zone upstream of the steam cracker (not shown), recycled to the steam cracker (not shown), or a combination of these. In certain embodiments, all, a substantial portion, a significant portion or a major portion of the heavy product stream 64 recycled as stream 64(r) to the hydrodealkylation zone 30 for further conversion into BTX and C9s. In certain embodiments, all, a substantial portion, a significant portion or a major portion of the heavy product stream 64 recycled to the initial feed treatment zone upstream of the steam cracker. In certain embodiments, all, a substantial portion, a significant portion or a major portion of the heavy product stream 64 recycled to the steam cracker.

In embodiments in which a transalkylation step is integrated, the transalkylation zone 66 operates in the presence of hydrogen, stream 68, to catalytically convert the C9+ aromatic stream 62 into additional BTX components, stream 70, through transalkylation and disproportionation reactions.

In certain embodiments (not shown) all or a portion of benzene and/or toluene recovered from stream 58, or benzene and/or toluene from another source, is also introduced to the transalkylation zone 66 for production of additional xylenes. In the integrated process and system herein, the light gases by-product stream 72 from the transalkylation zone 66, including $C_1$-$C_4$ and hydrogen, is routed to the gas treatment zone 74 (or alternatively to the steam cracker/separation zone 10, not shown), and the effluent stream 70 containing BTX is passed back to the BTX splitting zone 56. In certain optional embodiments, the effluent stream 70 is passed to an aromatics extraction step within the BTX splitting zone 56 and non-aromatic components are included with an aromatics lean stream 60. In certain optional embodiments, the effluent stream 70 can be passed to an aromatics separation unit, for instance unit 50 or a separate extraction unit, whereby an aromatics rich stream (typically an extract stream) is passed back to the BTX splitting zone 56, and an aromatics lean stream (typically a raffinate stream), which can include C5 and non-aromatic C6 components (light wild naphtha), is recovered and separately processed. In certain embodiments, all, a substantial portion, a significant portion or a major portion of the aromatics lean stream derived from the transalkylation effluent stream 70 is recycled to the steam cracking zone 10.

The gas treatment zone 74 collects light gas streams from the integrated process and system including from the reforming zone (stream 88), from the transalkylation zone (stream 72), and/or from the hydrodealkylation zone (stream 38). The gas treatment zone 74 can be a suitable known system including hydrogen purification units, such as a pressure swing adsorption (PSA) unit to obtain a hydrogen stream 76 having a purity of 99.9%+, or a membrane separation unit to obtain a hydrogen stream 76 with a purity of about 95%. In certain embodiments, the gas treatment zone 74 is also configured and arranged for recovery of naphtha range products, such as light naphtha. LPG and heavier components, stream 78, is passed to the steam cracking zone 10. Recovered hydrogen, stream 76, is sent to one or more of the hydrogen users in the integrated process and system.

Steam pyrolysis is a relatively complex process employing very high temperatures, high flow rates and production of large amounts of flammable gases. Steam cracker arrangements are well known and typically include several furnaces which are divided in a radiation (or pyrolysis) section, and a convection section. In a typical configuration, vaporization of the feed occurs in the convection section, recovering the flue gases heat from the radiation section. Vaporization is facilitated by mixing the hydrocarbons and steam. Steam is also produced in the convection section. Typically steam to oil ratio values range from about 0.3:1.0 to about 1.0:1.0, with the lower end suitable for lighter feeds such as ethane and the higher end suitable for heavier feeds. In steam cracking of heavier feeds including treated crude oil, the steam to oil ratio can be as high as 1:0:1:0 to 5:0:1:0. Steam cracker furnaces maximize recovery of flue gas energy via production of high pressure steam, which can be recovered for use elsewhere in the refinery and/or petrochemical operations.

The thermal cracking reactions occur mainly in the radiation section, typically at a set of coils. The number and shape of coils depend of the type of feed, and varies, for instance, depending on the selected configuration. Hydrocarbon steam cracking is an endothermic reaction that commences at coil inlet temperature (CIT), for instance, in the range of about 600-650° C., and finishes at a coil outlet temperature (COT), for instance, in the range of about 800-850° C. The values of the CIT and COT vary, for instance, +/−25%, based on factors such as the severity of the operation, the type of feed and the selected configuration. The furnaces are followed by the process by a temperature quench down targeting to halt thermal cracking reactions and to avoid recombination of olefins. Following quenching the coil effluent is routed to a separation section to produce hydrogen, which is can be recovered for use elsewhere in the refinery and/or petrochemical operations or used as fuel gas in the steam cracker furnaces, methane which is used as fuel gas in the steam cracker furnaces, ethylene as desired olefin product, propylene as desired olefin product, a mix of C4 olefins (butadiene, isobutene, butenes) and normal and iso butanes, a pyrolysis gasoline stream rich in aromatics and a PFO stream. Purified hydrogen gas can also be recovered with an integrated hydrogen purification system, for instance using a pressure swing adsorption (PSA) unit to obtain a hydrogen stream having a purity of 99.9%+, or a membrane separation unit to obtain a hydrogen stream with a purity of about 95%. In certain embodiments, the gas treatment zone 74 described above associated with the PFO treatment steps could be integrated with gas treatment operations for steam cracker products.

Units that are included in separation section include a primary fractionator after quench, water tower(s), gas compressor(s), a cold box and a series of distillations columns such as a demethanizer, deethanizer, ethylene-ethane splitter, depropanizer and propane-propylene splitter. The ethane and propane produced are typically recycled to the furnaces to extinction.

While a generalized description is provided above for steam cracking, it should be appreciated that other arrangements and conditions used for thermal cracking that produce the refractory PFO streams described herein can benefit from integration of the PFO treatments steps herein. In certain embodiments the feed to the steam cracker can be part of an integrated process and system as disclosed in commonly owned U.S. Pat. No. 9,255,230 (and its related U.S. Pat. Nos. 9,587,185 and 10,017,704), U.S. Pat. No. 9,284,497 (and its related U.S. Pat. No. 10,221,365), U.S. Pat. No. 9,279,088 (and its related U.S. Pat. No. 10,329,499), U.S. Pat. No. 9,296,961 (and its related U.S. Pat. No. 10,344,227), U.S. Pat. No. 9,284,502 (and its related U.S. Pat. No. 10,246,651), U.S. Pat. No. 9,382,486 (and its related U.S. Pat. No. 10,233,400), U.S. Pat. Nos. 9,228,139, 9,228,140, 9,228,141 and 9,284,501 (and its related U.S. Pat. Nos. 9,771,530 and 10,011,788), which are all incorporated by reference herein in their entireties.

In certain embodiments, a crude oil stream is fed to a hydrotreating zone, such as a fixed bed or slurry bed reactor in the presence of hydrogen, where the crude oil is hydrotreated to remove S, N, and other impurities. The gas and liquid product are separated, and a stripper is used to remove $H_2S$ and $NH_3$ from other gas products. In certain embodiments of the processes disclosed in the above-mentioned commonly owned patents, treated crude oil is used as the feedstock to a steam cracker feedstock. In certain embodiments of the processes disclosed in the above-mentioned commonly owned patents, a heavy fraction of treated crude oil is used as steam cracker feedstock. In certain embodiments, a feedstock hydroprocessing zone carries out selective hydroprocessing or hydrotreating of the initial feed that can increase the paraffin content (or decrease the BMCI) of a feedstock by saturation followed by mild hydrocracking of aromatics, especially polyaromatics. In certain embodiments, when hydrotreating a crude oil or other heavy oil feed, contaminants such as metals, sulfur and nitrogen can be removed by passing the feedstock through a series of layered catalysts that perform the catalytic functions of demetallization, desulfurization and/or denitrogenation, for example as disclosed in commonly owned U.S. Pat. No. 9,255,230 (and its related U.S. Pat. Nos. 9,587,185 and 10,017,704). In certain embodiments, hydrotreating a crude oil or other heavy oil feed to remove contaminants such as metals, sulfur and nitrogen is accomplished by slurry hydroprocessing as disclosed in commonly owned U.S. Pat. No. 9,284,501 (and its related U.S. Pat. Nos. 9,771,530 and 10,011,788). In certain embodiments, hydrotreating a crude oil or other heavy oil feed to remove contaminants such as metals, sulfur and nitrogen is preceded by solvent deasphalting, as disclosed in commonly owned U.S. Pat. No. 9,284, 502 (and its related U.S. Pat. No. 10,246,651). In certain embodiments, the hydroprocessed effluent from hydrotreating a crude oil or other heavy oil feed to remove contaminants such as metals, sulfur and nitrogen is subjected to solvent deasphalting, as disclosed in commonly owned U.S. Pat. No. 9,382,486 (and its related U.S. Pat. No. 10,233, 400).

For instance, in one embodiment, a crude oil or other heavy oil, feedstock and an effective amount of hydrogen, are charged to a hydroprocessing reaction zone operating generally at a temperature in the range of from 300-450° C. In certain embodiments, the hydroprocessing reaction zone includes one or more unit operations. In certain embodiments, the feed is crude oil and the operations are as described in commonly owned US Patent Publication 2011/ 0083996 and in PCT Patent Application Publications WO2010/009077, WO2010/009082, WO2010/009089 and WO2009/073436, all of which are incorporated by reference herein in their entireties. The crude oil feedstock hydroprocessing zone can include one or more beds containing an effective amount of hydrodemetallization catalyst, and one or more beds containing an effective amount of hydroprocessing catalyst having hydrodearomatization, hydrodenitrogenation, hydrodesulfurization and/or hydrocracking functions. In additional embodiments the feedstock hydroprocessing zone includes more than two catalyst beds. In further embodiments a feedstock hydroprocessing zone includes plural reaction vessels each containing one or more catalyst beds, for example, of different function. The reaction vessels(s) in the feedstock hydroprocessing zone operates under parameters effective to hydrodemetallize, hydrodearomatize, hydrodenitrogenate, hydrodesulfurize and/or hydrocrack the crude oil feedstock. In certain embodiments, hydroprocessing is carried out using the following conditions: operating temperature in the range of from about 300-450° C.; operating pressure in the range of from about 30-180 kg/cm$^2$; and a liquid hour space velocity in the range of from 0.1-10 h$^{-1}$. In embodiments using crude oil as the initial feed to the feedstock hydroprocessing zone, certain advantages are realized as compared to the same hydroprocessing unit operation employed for atmospheric residue. For instance, at a start of run temperature in the range of 370-375° C., the deactivation rate is around 1° C. per month. In contrast, if residue were to be processed, the deactivation rate would be closer to about 3 to 4° C. per month. The treatment of atmospheric residue typically employs pressure of around 200 kg/cm' whereas the present process in which crude oil is treated can operate at pressures as low as 100 kg/cm'. Additionally, to achieve the high level of saturation required for the increase in the hydrogen content of the feed, this process can be operated at a high throughput when compared to atmospheric residue. The LHSV can be as high as 0.5 hr$^{-1}$ while that for atmospheric residue is typically 0.25 hr$^{-1}$. The deactivation rate when hydroprocessing crude oil is going in the inverse direction from that which is usually observed. Deactivation at low throughput (0.25 hr$^{-1}$) is 4.2° C. per month and deactivation at higher throughput (0.5 hr$^{-1}$) is 2.0° C. per month; this can be attributed to the washing effect of the catalyst.

Reactor effluents from the feedstock hydroprocessing zone are typically cooled in an exchanger and sent to a high pressure cold or hot separator. Separator tops are cleaned in an amine unit and the resulting hydrogen rich gas stream is passed to a recycling compressor and can be used as a recycle gas in the feedstock hydroprocessing reaction zone. Separator bottoms from the high pressure separator, which are in a substantially liquid phase, are cooled and then introduced to a low pressure cold separator. Remaining gases, including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. In certain embodiments of the present process, hydrogen is recovered by combining low pressure separator with gases in the steam cracker products. The hydroprocessed effluent contains a reduced content of contaminants (such as metals, sulfur and nitrogen), an increased paraffinicity, reduced BMCI, and an increased American Petroleum Institute (API) gravity.

In one embodiment, the sequence of catalysts to perform hydrodemetallization (HDM) and hydrodesulfurization (HDS) is as follows: (i) A hydrodemetallization catalyst. The catalyst in the HDM section are generally based on a gamma alumina support, with a surface area of about 140-240 m$^2$/g. This catalyst is best described as having a very high pore volume, for example, in excess of 1 cm$^3$/g. The pore size itself is typically predominantly macroporous. This is required to provide a large capacity for the uptake of metals on the catalysts surface and optionally dopants. Typically, the active metals on the catalyst surface are sulfides of nickel and molybdenum in the ratio Ni/Ni+Mo<0.15. The concentration of nickel is lower on the HDM catalyst than other catalysts as some nickel and vanadium is anticipated to be deposited from the feedstock itself during the removal, acting as catalyst. The dopant used can be one or more of phosphorus (see, for example, US Patent Publication US 2005/0211603 which is incorporated by reference herein), boron, silicon and halogens. The catalyst can be in the form of alumina extrudates or alumina beads. In certain embodiments alumina beads are used to facilitate un-loading of the catalyst HDM beds in the reactor as the metals uptake will range between from 30 to 100% at the top of the bed. (ii) An intermediate catalyst can also be used to perform a transition between the HDM and HDS function. It has intermediate metals loadings and pore size distribution. The catalyst in the HDM/HDS reactor is essentially alumina based support in the form of extrudates, optionally at least one catalytic metal from the Periodic Table of the Elements IUPAC Group 6 (for example, molybdenum and/or tungsten), and/or at least one catalytic metal from the Periodic Table of the Elements IUPAC Groups 9 or 10 (for example, nickel and/or cobalt). The catalyst also contains optionally at least one dopant selected from boron, phosphorous, halogens and silicon. Physical properties include a surface area of about 140-200 m$^2$/g, a pore volume of at least 0.6 cm$^3$/g and pores which are mesoporous and in the range of 12 to 50 nm. (iii) The catalyst in the HDS section can include those having gamma alumina based support materials, with typical surface area towards the higher end of the HDM range, for example about ranging from 180-240 m²/g. This required higher surface for HDS results in relatively smaller pore volume, for example, lower than 1 cm³/g. The catalyst contains at least one element from the Periodic Table of the Elements IUPAC Group 6, such as molybdenum and at least one element from the Periodic Table of the Elements IUPAC Groups 9 or 10, such as nickel. The catalyst also comprises at least one dopant selected from boron, phosphorous, silicon and halogens. In certain embodiments cobalt is used to provide relatively higher levels of desulfurization. The metals loading for the active phase is higher as the required activity is higher, such that the molar ratio of Ni/Ni+Mo is in the range of from 0.1 to 0.3 and the (Co+Ni)/Mo molar ratio is in the range of from 0.25 to 0.85. (iv) A final catalyst (which could optionally replace the second and third catalyst) is designed to perform hydrogenation of the feedstock (rather than a primary function of hydrodesulfurization), for instance as described in Appl. Catal. A General, 204 (2000) 251. The catalyst will be also promoted by Ni and the support will be wide pore gamma alumina. Physical properties include a surface area towards the higher end of the HDM range, for example, 180-240 m²/g This required higher surface for HDS results in relatively smaller pore volume, for example, lower than 1 cm³/g.

In certain embodiments the bottoms stream from the low pressure cold separator is the feed to the steam pyrolysis zone. In additional embodiments, bottoms from the low pressure separator are sent to a separation zone wherein heavy materials such as those in the atmospheric or vacuum residue range are removed from the system, and the remainder is passed to the steam pyrolysis zone. In further embodiments, bottoms from the low pressure separator are sent to a separation zone wherein a light portion bypasses all or a portion of the steam pyrolysis zone, and a heavy portion serves as feed to a convection section of a steam pyrolysis zone. The separation zone can include a suitable separation unit operation such as a flash vessel or distillation column that separates based on boiling point, a separation device based on physical or mechanical separation of vapors and liquids, or a combination including at least one of these types of devices.

FIGS. 3-6 schematically depict embodiments of steam cracking systems integrating pretreatment of the feed. The steam cracking zone 10 operates as described above and is schematically shown as including a steam cracking convection section 102 and a steam cracking pyrolysis section 112. The steam cracking feed 12 (which can be a hydroprocessed initial feed 126 as in FIG. 3; a hydroprocessed initial feed having a bottom fraction removed, stream 136 as in FIG. 4; a hydroprocessed initial feed having tops removed, stream 144 as in FIG. 5; or a deasphalted stream 156 as in FIG. 6) is passed to the steam cracking convection section 102 along with steam for vaporization of the feed. A heated stream 104 is passed to the steam cracking pyrolysis section 112 for thermal cracking reactions and to produce a thermally cracked mixed product stream 114. In certain embodiments, a separation zone 106 is included between the steam cracking convection section 102 and the steam cracking pyrolysis section 112. A light portion, stream 108 from the separation zone 106, is passed to the steam cracking pyrolysis section 112, and a heavy portion 110 is discharged. The thermally cracked mixed product stream 114 is passed to a steam cracking effluent separation zone 116 which can operate as is commonly known, for instance, using primary fractionating, quench separation and olefins recovery to generally obtain one or more C2, C3 and/or C4 olefins streams 14, a pygas (C5-C9 range) stream 16 and a PFO (C9+) stream 18.

In certain embodiments, the steam cracking effluent separation zone 116 also includes or is integrated with a suitable hydrogen purification units, such as a pressure swing adsorption (PSA) unit to obtain a hydrogen stream 118 having a purity of 99.9%+, or a membrane separation unit to obtain a hydrogen stream 118 with a purity of about 95%. Methane (not shown) can also be recovered and used as fuel gas in the steam cracker furnaces or other fuel gas users within the integrated system. The PFO stream 18 is passed to a PFO treatment zone 20.

Figure 3:
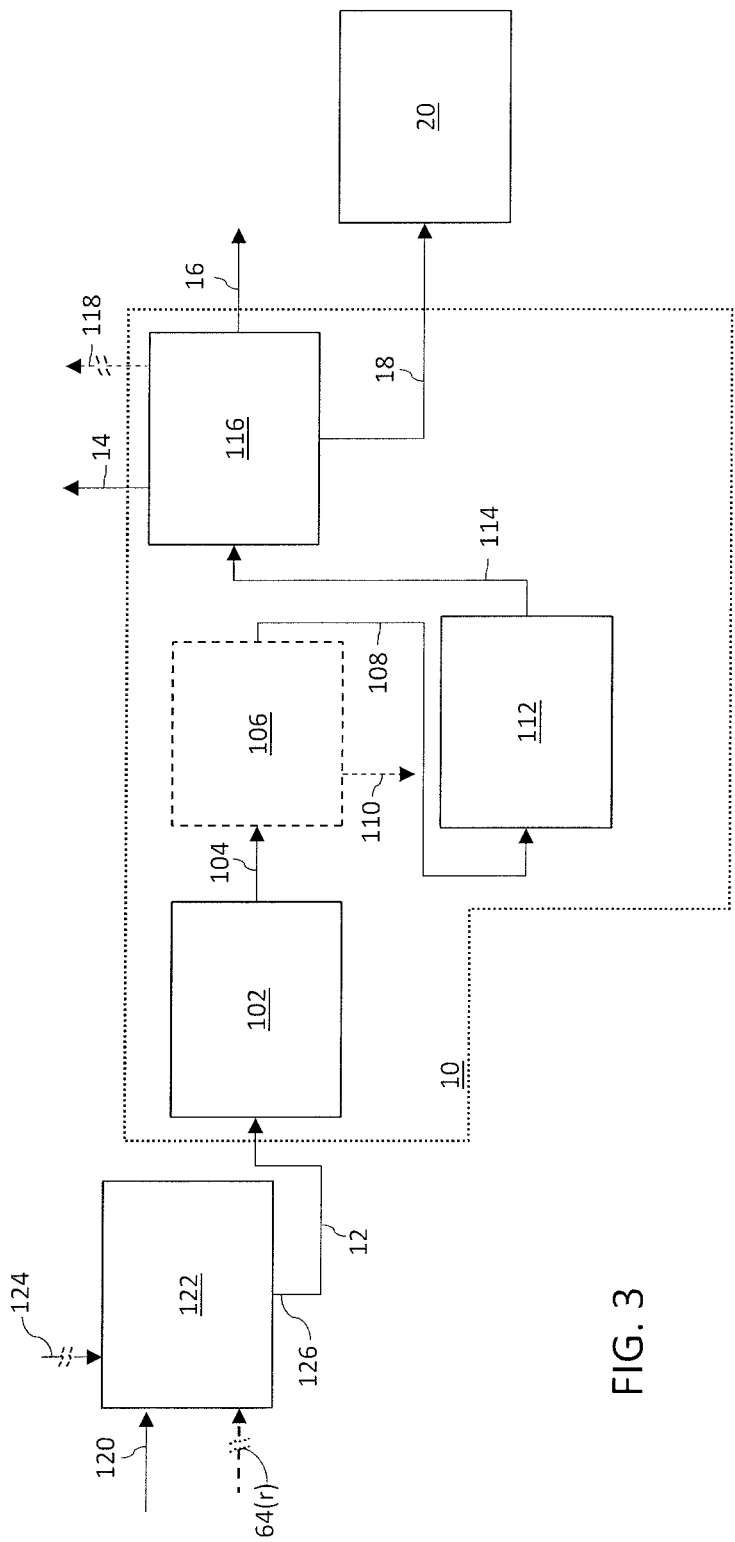
FIGS. 3, 4, 5 and 6 schematically depict operations of steam cracking units integrated with feed pretreatment.

In one embodiment, with reference to FIG. 3, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126 that serves as the steam cracking feed 12. As noted herein, the effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that serves as the steam cracking feed 12.

Figure 4:
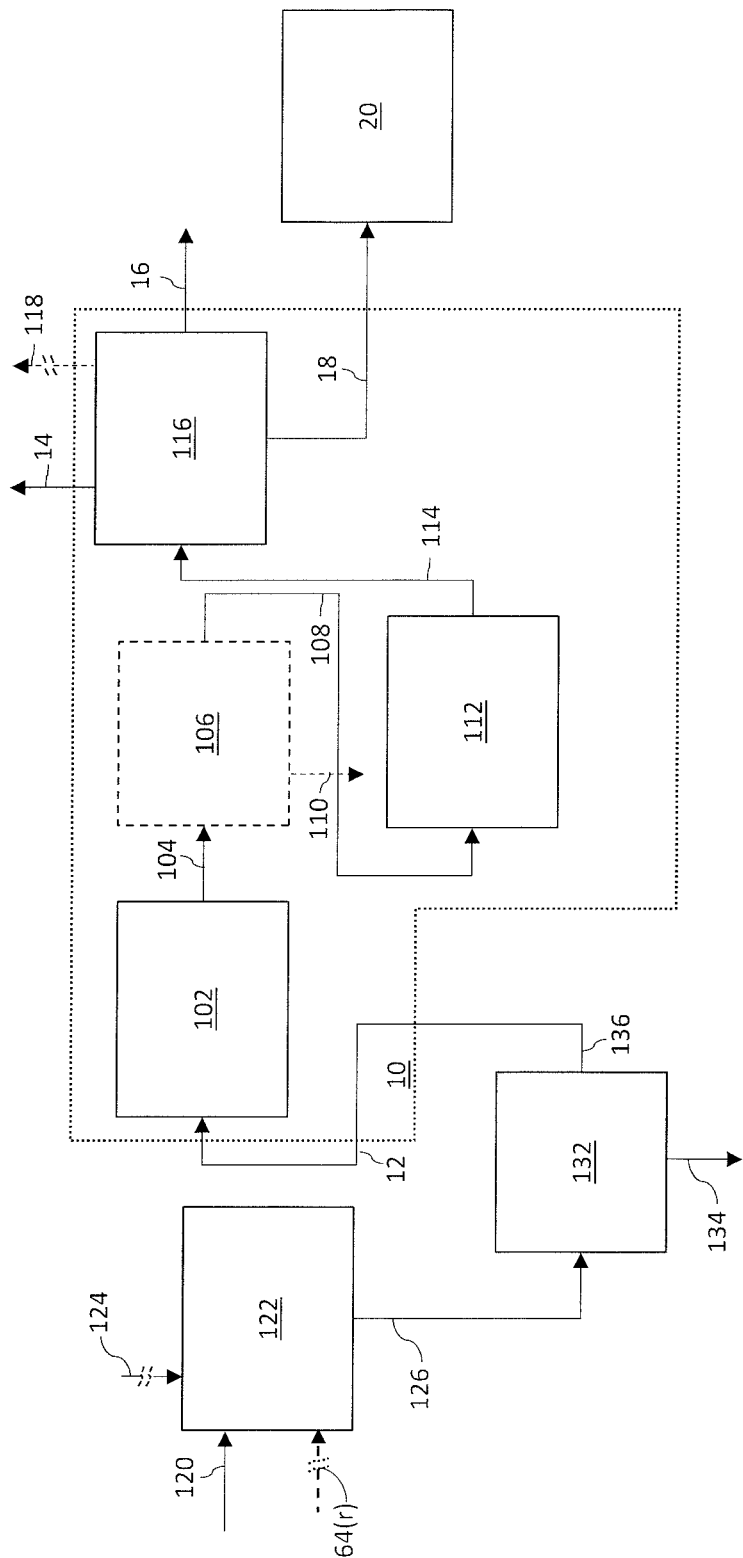

In another embodiment, with reference to FIG. 4, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126. The hydroprocessed effluent is passed to a separation zone 132 upstream of the steam cracking zone to remove heavy components such as residual range components as a stream 134, and the remainder of the bottomless feed, in certain embodiments bottomless crude oil, stream 136, serves as the steam cracking feed 12. The hydroprocessed effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that is passed to the separation zone 132 to remove residual range components as a heavy stream 134; the remaining stream 136 serves as the steam cracking feed 12. In certain embodiments the heavy stream 134 has an initial boiling point corresponding to vacuum residue, for instance in the range of about 500-550, 500-540, 500-530, 510-550, 510-540 or 510-530° C. The bottomless stream 136 can have, for instance, an initial boiling point corresponding to that of the stream 126 and an end boiling point corresponding to the initial boiling point of the heavy stream 134.

Figure 5:
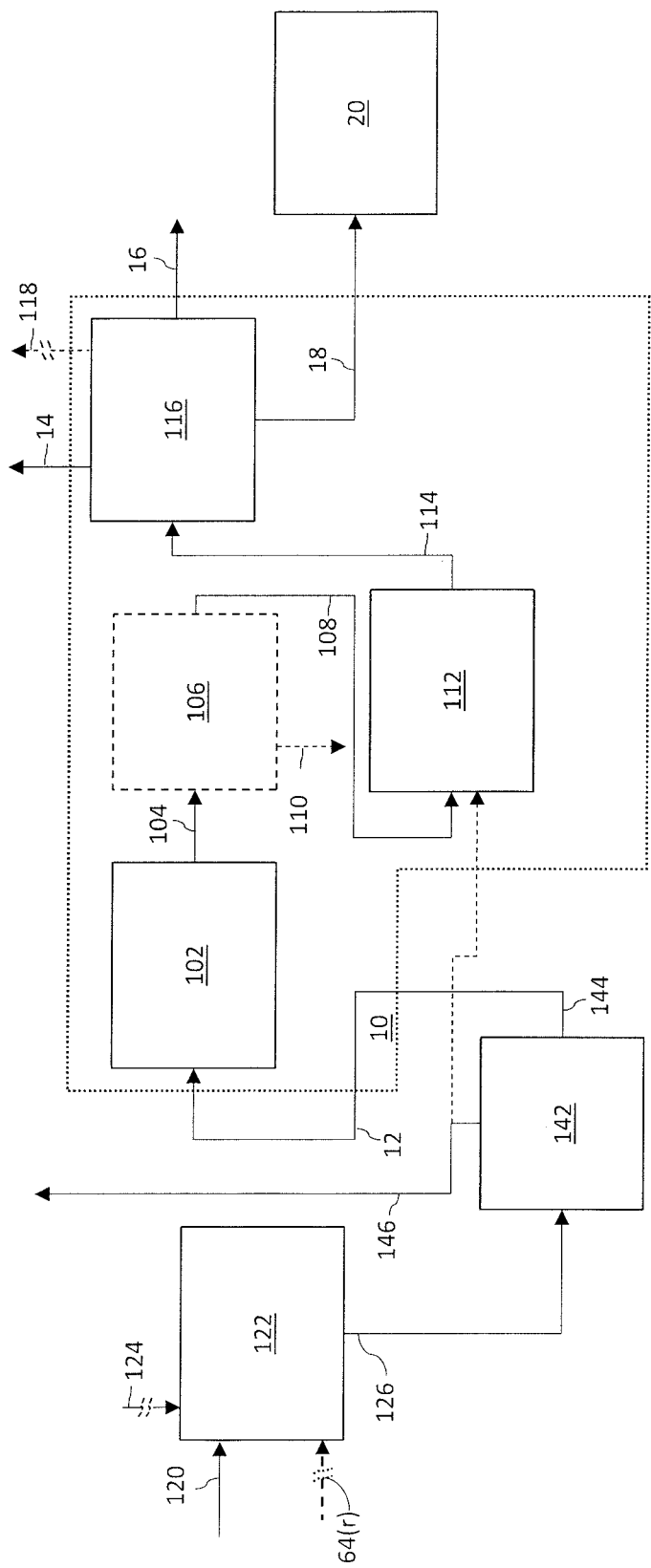

In another embodiment, with reference to FIG. 5, a schematic process flow diagram of a feedstock hydroprocessing zone and a steam cracking zone is shown, including a feedstock hydroprocessing zone 122 for treating an initial feedstock 120 (and optionally a recycle stream 64(r) as described herein) in the presence of hydrogen, shown as hydrogen stream 124, to produce a hydroprocessed effluent stream 126. The hydroprocessed effluent is passed to a separation zone 142 upstream of the steam cracking zone to remove light components, stream 146, and the remaining heavy components, in certain embodiments a topped hydroprocessed initial feed, stream 144, serves as the steam cracking feed 12. The hydroprocessed effluent can be subjected to a high pressure cold or hot separator to obtain a hydrogen rich gas stream that is used as a recycle gas in the reactor of the feedstock hydroprocessing zone 122. A separator bottoms stream from the high pressure separator, in a substantially liquid phase, is cooled and then introduced to a low pressure cold separator. A separator bottoms stream from the low pressure separator, in a substantially liquid phase, is the stream 126 that is passed to the separation zone 142 to separate remove light components, stream 146; the remainder, stream 144, serves as the steam cracking feed 12. In certain embodiments the stream 146 has an end boiling point corresponding to that of naphtha or light naphtha, and the stream 144 has an initial boiling point corresponding to the end boiling point of the stream 146.

In the embodiments of FIGS. 3, 4 and 5, the initial feedstock 120 can be as described herein, for instance selected from crude oil and other heavy oil streams such as those in the atmospheric gas oil range, atmospheric residue range, vacuum gas oil range and/or vacuum residue range.

Figure 6:
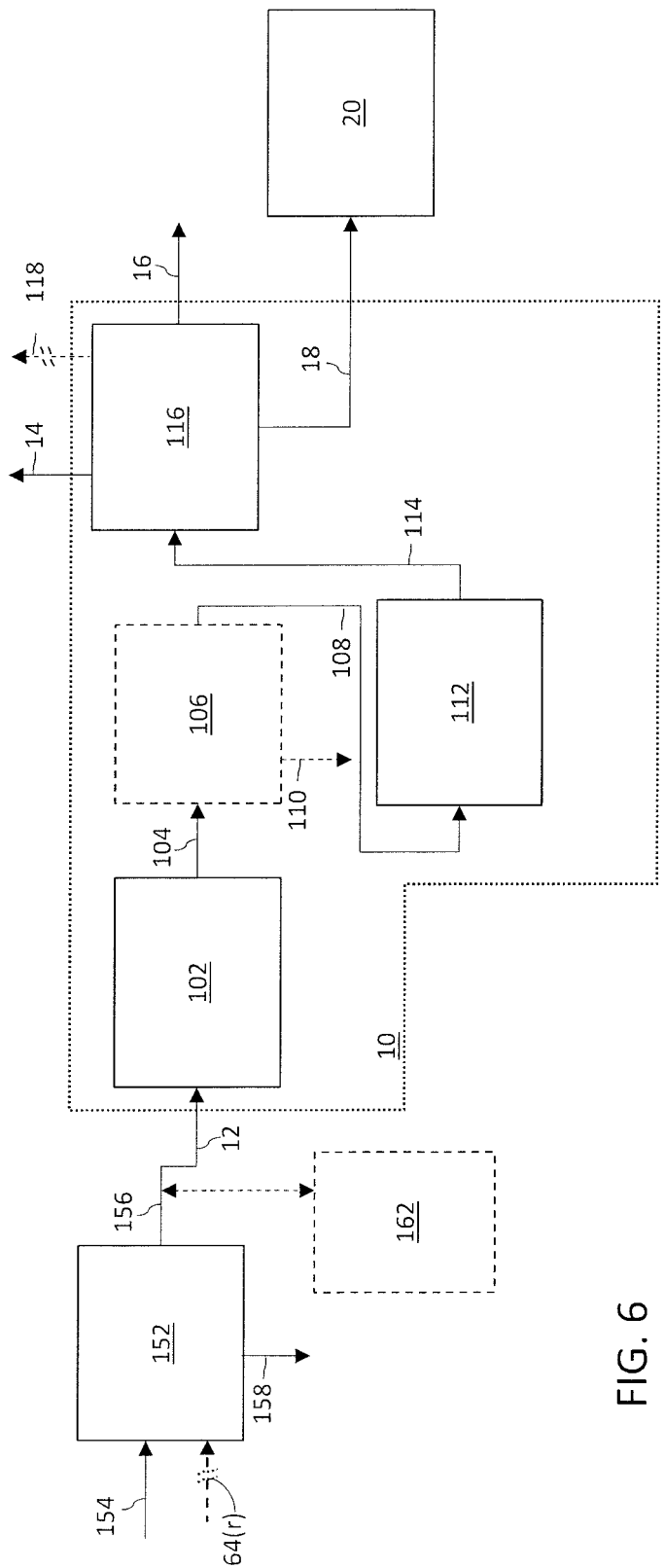

In another embodiment, with reference to FIG. 6, a schematic process flow diagram of a feedstock deasphalting zone and a steam cracking zone is shown, including a feedstock deasphalting zone 152 for treating a deasphalting feedstock 154 (and optionally a recycle stream 64($r$) as described herein) to produce a deasphalted oil stream 156 and an asphalt phase stream 158. In certain embodiments, the deasphalting feedstock 154 can be an initial feed as described herein, for instance selected from a treated crude oil stream and other treated heavy oil streams such as those in the atmospheric gas oil range, atmospheric residue range, vacuum gas oil range and/or vacuum residue range. In certain embodiments, the deasphalting feedstock 154 can be all or a portion of a hydroprocessed effluent, for instance, a hydroprocessed initial feed 126 as described with respect to FIG. 3; a hydroprocessed initial feed having a bottom fraction removed, stream 136 as described with respect to FIG. 4; or a hydroprocessed initial feed having tops removed, stream 144 as described with respect to FIG. 5. In further embodiments, the deasphalting feedstock 154 can be an initial feed as described herein, and the deasphalted oil stream 156 is passed to an optional hydroprocessing zone, schematically shown as zone 162. For instance, the deasphalted oil stream 156 can serve as the initial feed 120 in the integrated systems described with respect to FIGS. 3, 4 and 5. In certain embodiments, the optional zone 162 can be a separation zone, for instance that operates similar to the pre-steam cracking separation zone 132 described with respect to FIG. 4 to pass a bottomless stream 136 as the steam cracking feed 12, or similar to the pre-steam cracking separation zone 142 described with respect to FIG. 5 to pass a topped feed 144 as the steam cracking feed 12.

In embodiments in which solvent deasphalting is employed prior to the steam cracking zone (either before hydroprocessing of the initial feed, between hydroprocessing of the initial feed and steam cracking, or in the absence of hydroprocessing of the initial feed), solvent deasphalting can be carried out with paraffin streams having carbon number ranging from 3-7, in certain embodiments ranging from 4-5, at conditions that are below the critical temperature and pressure conditions of the solvent. The feed is mixed with the light paraffinic solvent, where the deasphalted oil is solubilized in the solvent. The insoluble pitch will precipitate out of the mixed solution and is separated from the DAO phase (solvent-DAO mixture) in the extractor. Solvent deasphalting is carried-out in liquid phase and therefore the temperature and pressure are set accordingly. There are typically two stages for phase separation in solvent deasphalting. In the first separation stage, the temperature is maintained lower than that of the second stage to separate the bulk of the asphaltenes. The second stage temperature is maintained to control the deasphalted/demetalized oil (DA/DMO) quality and quantity. The temperature impacts the quality and quantity of DA/DMO. An increase in the extraction temperature will result in a decrease in deasphalted/demetalized oil yield, which means that the DA/DMO will be lighter, less viscous, and contain less metals, asphaltenes, sulfur, and nitrogen. A temperature decrease will have the opposite effects. In general, the DA/DMO yield decreases having higher quality, by raising extraction system temperature; and increases, having lower quality, by lowering extraction system temperature. The composition of the solvent is an important process variable. The solubility of the solvent increases with increasing critical temperature, generally according to C3<iC4<nC4<iC5. An increase in critical temperature of the solvent increases the DA/DMO yield. However, it should be noted that the solvent having the lower critical temperature has less selectivity resulting in lower DA/DMO quality. The volumetric ratio of the solvent to the solvent deasphalting unit charge impacts selectivity and to a lesser degree on the DA/DMO yield. Higher solvent-to-oil ratios result in a higher quality of the DA/DMO for a fixed DA/DMO yield. Higher solvent-to-oil ratio is desirable due to better selectivity. The composition of the solvent will also help to establish the required solvent to oil ratios. The required solvent to oil ratio decreases as the critical solvent temperature increases. The solvent to oil ratio is, therefore, a function of desired selectivity, operation costs and solvent composition.

The hydrodealkylation zone 30 includes an effective reactor configuration with the requisite reaction vessel(s), feed heaters, heat exchangers, hot and/or cold separators, product fractionators, strippers, and/or other units to process all or a portion of the stream 26 from the PFO separation zone 22 containing C9+ aromatics compounds with one benzene ring and C10+ aromatics compounds with no less than 2 and up to 6 (typically between 2 and 4) benzene rings, or all or a portion of the PFO C9+ stream 18 from the steam cracker/separation zone 10. The hydrodealkylation zone 30 generally contains one or more fixed bed, fluidized bed, ebullated bed, slurry bed, moving bed, continuous stirred tank, or tubular reactors, in series or parallel arrangement, which is/are generally operated in the presence of hydrogen under conditions, and utilizes catalyst(s), effective for conversion of polyaromatics, such as naphthalene, methylnaphthalene, anthracene, C4-benzene, C5-benzene, naphthenodiaromatics, by partial hydrogenation (preserving one aromatic ring) and selective ring opening (preserving the aromatic ring structure), into benzene and alkylbenzenes, for instance benzene, toluene and xylenes (BTX). For example, a polyaromatic such as naphthalene or methylnaphthalene is converted to an ortho-fused bicyclic hydrocarbon having one aromatic ring preserved, such as tetralin and derivatives. The non-aromatic ring is cracked to yield BTX compounds, other alkylbenzenes, LPG and naphtha. In certain embodiments, multiple reactors can be provided in parallel in hydrodealkylation zone 30 to facilitate catalyst replacement and/or regeneration. The hydrodealkylation zone 30 generally includes a reaction vessel having multiple beds of different functional catalysts, multiple reaction vessels of different functional catalysts, a mixture of different functional catalysts in a reaction vessel, multi-functional catalysts in a reaction vessel, or a mixture of different functional catalysts and multi-functional catalysts in a reaction vessel. In embodiments including a reaction vessel having multiple beds of different functional catalysts, or multiple reaction vessels of different functional catalysts, polyaromatics are selectively hydrogenated, and resulting single ring compounds are selectively hydrocracked/dealkylated. In embodiments including a mixture of different functional catalysts, and/or or multi-functional catalysts, in a reaction vessel, the polyaromatics are subjected to selective hydrogenation and selective hydrocracking.

The hydrodealkylation zone 30 generally has one or more inlets in fluid communication with a source of feedstock. In certain embodiments, the feedstock is all or a portion of the stream 26 containing C9+ aromatics compounds with one benzene ring and C10+ aromatics compounds with no less than 2 and up to 6 (typically between 2 and 4) benzene rings (as disclosed in conjunction with the embodiment of FIG. 1). In certain embodiments, the feedstock is all or a portion of the full range PFO C9+ stream from the steam cracker/separation zone 10 (as disclosed in conjunction with the embodiments of FIG. 2). The hydrodealkylation zone 30 is in fluid communication with a hydrogen stream 32. The hydrogen stream 32 can be passed to the reactors at one or more locations as is known, and can be derived from sources including recycled hydrogen from the integrated steam cracking unit (not shown in FIGS. 1 and 2), produced hydrogen 76 from the gas treatment zone 74, and hydrogen 90 from the reforming zone 80. Make-up hydrogen from another source (not shown) is also typically added.

The outlet(s) of the hydrodealkylation zone 30 discharge the effluent stream 34, and in fluid communication with one or more inlets of the separation zone 36. The separation zone 36 can include one or more simple or fractional distillation columns and generally includes one or more outlets for discharging light gases, stream 38 including LPG and $H_2$, and the remainder of the effluent stream 34, the hydrodealkylated stream 42. One or more outlets that discharge the effluent stream 42 are fluid communication with one or more inlets of the BTX splitting zone 56. In certain embodiments (not shown), effluents from the reaction vessels are cooled in an exchanger and sent to a high pressure cold or hot separator and liquid effluents are passed to the BTX splitting zone 56. In certain embodiments, the one or more outlets of reaction zone that discharge the hydrodealkylated effluent stream 42 are in fluid communication with one or more inlets of the aromatics extraction zone 50, whereby the extract 52 is passed to the BTX splitting zone 56.

In operation, the hydrodealkylation feedstock and a hydrogen stream are charged to the reactor of the hydrodealkylation zone 30. The hydrogen stream contains an effective quantity of hydrogen to support the selective hydrogenation and hydrocracking of the polyaromatics compounds in the feed, the reaction conditions, the selected catalysts and other factors, and can be any combination including recycle hydrogen from optional gas separation subsystems (not shown) between the reaction zone and fractionating zone, hydrogen derived from the hydrogen producers within the integrated system and process, stream 76, and in certain embodiments 90, and make-up hydrogen as necessary.

The hydrodealkylation reaction effluent stream is typically passed to one or more high pressure and low pressure separation stages recover recycle hydrogen. For example, effluents from the hydrodealkylation reaction vessel are cooled in an exchanger and sent to a high pressure cold or hot separator. Separator tops are cleaned in an amine unit and the resulting hydrogen rich gas stream is passed to a recycling compressor to be used as a recycle gas in the hydrodealkylation reaction vessel. Separator bottoms from the high pressure separator, which are in a substantially liquid phase, are cooled and then introduced to a low pressure cold separator. Remaining gases including hydrogen and any light hydrocarbons, which can include $C_1$-$C_4$ hydrocarbons, can be conventionally purged from the low pressure cold separator and sent for further processing, for instance to the gas treatment zone 74. The liquid stream from the low pressure cold separator is passed to the separation zone 36, generally to recover an LPG/$H_2$ stream 38 and the hydrodealkylated BTX+ stream 42. In certain embodiments, the fractionating zone can operate as one or more flash vessels to separate heavy components at a suitable cut point, for example, a range corresponding to the hydrodealkylated BTX+ stream 42 that is passed to the BTX splitting zone 56.

Reaction operating conditions and catalysts are selected so as to maximize the conversion of polyaromatics, such as naphthalene, methylnaphthalene, anthracene, naphtheno-di-aromatics (three rings, one saturated and two aromatic), into BTX components by hydrodealkylation, including selective hydrogenation into aromatic compounds with one benzene ring and selective ring opening and hydrodealkylation. For example, the hydrodealkylation zone 30 can generally operates under effective conditions including:

- a reaction temperature (° C.) in the range of about 300-550, 300-500, 300-450, 320-550, 320-500, 320-450, 350-550, 350-500, or 350-450° C.;
- a reaction pressure (hydrogen partial pressure, kg/cm$^2$) in the range of about 3-30, 3-25, 3-20, 5-30, 5-25, 5-20, 10-30, 10-25, 10-20 kg/cm$^2$;
- a hydrogen feed rate (standard liters per liter of hydrocarbon feed, SLt/Lt) in the range of about 1-30, 1-25, 1-20, 5-30, 5-25, 5-20 SLt/Lt; and
- a LHSV in the range of about 0.1-10, 0.1-8, 0.1-5, 0.5-10, 0.5-8, 0.5-5, 1-10, 1-8, or 1-5.

In certain embodiments, in which C20+ are substantially removed prior to the hydrodealkylation zone 30, effective operating conditions include:

- a reaction temperature (° C.) in the range of about 300-500, 300-450, 320-500, or 320-450° C.;
- a reaction pressure (hydrogen partial pressure, kg/cm$^2$) in the range of about 3-25, 3-20, 5-25, 5-20, 10-25, 10-20 kg/cm$^2$;
- a hydrogen feed rate (standard liters per liter of hydrocarbon feed, SLt/Lt) in the range of about 1-25, 1-20, 5-25, 5-20 SLt/Lt; and
- a LHSV in the range of about 0.1-8, 0.1-5, 0.5-8, 0.5-5, 1-8, or 1-5.

In certain embodiments, in which the C9+ PFO stream is used as feed (without separation of C20+) to the hydrodealkylation zone 30, effective operating conditions include:

- a reaction temperature (° C.) in the range of about 300-550, 300-500, 300-450, 350-550, 350-500, or 350-450° C.;
- a reaction pressure (hydrogen partial pressure, kg/cm$^2$) in the range of about 3-30, 3-25, 3-20, 5-30, 5-25, 5-20, 10-30, 10-25, 10-20 kg/cm$^2$;
- a hydrogen feed rate (standard liters per liter of hydrocarbon feed, SLt/Lt) in the range of about 1-30, 1-20, 5-30, 5-20 SLt/Lt; and
- a LHSV in the range of about 0.1-10, 0.1-8, 0.1-5, 0.5-10, 0.5-8, 0.5-5, 1-10, 1-8, or 1-5.

Suitable catalyst effective for conversion of polyaromatics to BTX components in the hydrodealkylation zone 30 include multiple beds of different functional catalysts in a reaction vessel, multiple reaction vessels in series having different functional catalysts, a mixture of different functional catalysts in a reaction vessel, or multi-functional catalysts in a reaction vessel. In embodiments in which different functional catalysts are used, a first functional catalyst includes selective hydrogenation catalysts such as an acid or metal catalyst, and in certain embodiments dual functionality catalyst materials or a combination of catalyst materials having different functionalities of cracking and hydrogenation; and a second functional catalyst includes selective hydrocracking catalysts such as selective ring opening and hydrodealkylation catalysts. In embodiments in which multi-functional catalysts are used, a combined catalysts material can be used that includes functionalities for selective hydrogenation and selective hydrocracking, for instance, with different active components deposited or otherwise incorporated on a support material.

The first functional catalyst used in the hydrodealkylation zone 30 can be one or more conventionally known, commercially available or future developed hydrogenation catalysts effective to maximize the conversion of polyaromatics, such as naphthalene, methylnaphthalene, anthracene, naphtheno-diaromatics (three rings, one saturated and two aromatic), by selective hydrogenation into aromatic compounds with one benzene ring. The selection, activity and form of the selective hydrogenation catalyst can be determined based on factors including but not limited to operating conditions, selected reactor configuration, feedstock composition, and desired degree of conversion. Dual functionality, hydrogenating and cracking, catalysts are useful for conversion of selective conversion of polycyclic aromatic compounds into aromatic compounds or bicyclic aromatic compounds. For instance, catalysts similar to selective acetylene hydrogenation catalysts for ethylene production while minimizing ethane formation are known and can be used in the hydrodealkylation zone 30. In those known catalysts, Pd/alumina is typical; in the hydrodealkylation zone 30 Pd can be substituted by one or more other effective metal components as other one or combination of metals as described herein, for instance, Mo, Co, Ir, Pd, Pt, Ni, W, Sn or Ga).

Suitable first functional catalysts generally contain one or more first active components of metals or metal compounds (oxides, carbides or sulfides), for instance a metal selected from the Periodic Table of the Elements IUPAC Groups 6, 9, 10, 13 and/or 14, such as Mo, Co, Ir, Pd, Pt, Ni, Sn, W or Ga, and one or more second active components, for instance a metal, metal compound, non-metal such as P, or other non-metal compound. In certain embodiments two or more of the first active components mentioned above are used. One, two or more of the above-mentioned active components are typically deposited or otherwise incorporated on a catalyst support, which can be amorphous and/or structured, such as silica-alumina, silica, titania, titania-silica, titania-silicates, zeolites (including HY, beta, mordenite, ZSM-5, ZSM-12, ZSM-22, ZSM-11, MCM-22, MCM-56, or SSZ-26/33 zeolites), or similar crystalline materials to zeolites such as SAPO. The catalyst support(s) can be subjected to treatment whereby support properties such as pore volume, surface area, and average pore size are altered, such as by meso-structuring treatments which include one or more of desilication, de-alumination, steaming, acid leaching, and templated re-crystallization. In embodiments in which P is used, elemental form of P can be added and treated with $H_2SO_4$, whereby after treatment P remains in the structure of the catalyst. Combinations of active components can be composed of different particles/granules containing a single active metal species, or particles containing multiple active components. In embodiments in which zeolites or other crystalline materials are used, they are conventionally formed with one or more binder components such as alumina, silica, silica-alumina, clay, titania and mixtures thereof. In certain embodiments, the catalyst particles have a pore volume in the range of about (cc/gm) 0.15-1.70, 0.15-1.50, 0.30-1.50 or 0.30-1.70; a specific surface area in the range of about ($m^2/g$) 100-900, 100-500, 100-450, 180-900, 180-500, 180-450, 200-900, 200-500 or 200-450; and an average pore diameter of at least about 30, 45 or 50, in certain embodiments in the range of about 30-80, 45-80, 50-80, 30-100, 45-100 or 50-100, 30-200, 45-200 or 50-200 angstrom units. The active component(s) are incorporated in an effective concentration, for instance, in the range of (wt % based on the mass of the active component(s) relative to the total mass of the catalysts including the support and binders) 1-40, 1-30, 1-10, 1-5, 2-40, 2-30, 2-10, 3-40, 3-30 or 3-10. Effective catalysts to promote hydrogenation reactions include but are not limited to those having one or more effective first active components, for instance, Mo, Co, Ir, Pd, Pt, Ni, W, Sn or Ga, and optionally a second active components such as P, deposited or otherwise incorporated on a support formed of alumina and/or zeolite. Examples include but are not limited to MoP/zeolite (including HY zeolites), Pd/alumina (for instance catalysts similar to selective acetylene hydrogenation catalysts for ethylene production while minimizing ethane formation which are known), Pd/zeolite, MoP/alumina, NiP/alumina, NiP/zeolite, WP/alumina, WP/zeolite, or sulfided NiMo/alumina.

In certain embodiments, the first functional catalyst and/or the catalyst support is prepared in accordance with U.S. Pat. No. 9,221,036 and its continuation U.S. Pat. No. 10,081,009 (jointly owned by the owner of the present application, and subject to a joint research agreement), which is incorporated herein by reference in its entirety. Such a support includes a modified zeolite support having one or more of Ti, Zr and/or Hf substituting the aluminum atoms constituting the zeolite framework thereof. For instance, the first functional catalyst effective for hydrogenation can include one or more active component carried on a support containing a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

The second functional catalyst used in the hydrodealkylation zone 30 can be one or more conventionally known, commercially available or future developed catalyst materials effective for selective ring opening and hydrodealkylation. The selection, activity and form of the selective ring opening and hydrodealkylation catalyst (the second functional catalyst) can be determined based on factors including but not limited to operating conditions, selected reactor configuration, feedstock composition, and desired degree of conversion. Suitable second functional catalysts contain one or more active components that are metals or metal compounds (oxides, carbides or sulfides) selected from the Periodic Table of the Elements IUPAC Groups 6, 7, 8, 9 and 10, such as Ni, W or Mo. In certain embodiments two or more of the active components mentioned above are used. One, two or more of the above-mentioned active components are typically deposited or otherwise incorporated on a support, which can be amorphous and/or structured, such as silica-alumina, silica, titania, titania-silica, titania-silicates, zeolites (including HY, beta, mordenite, ZSM-5, ZSM-12, ZSM-22, ZSM-11, MCM-22, MCM-56, or SSZ-26/33 zeolites), or similar crystalline materials to zeolites such as SAPO. The catalyst support(s) can be subjected to treatment whereby support properties such as pore volume, surface area, and average pore size are altered, such as by meso-structuring treatments which include one or more of desilication, de-alumination, steaming, acid leaching, and templated re-crystallization. Combinations of active components can be composed of different particles/granules containing a single active metal species, or particles containing multiple active components. In embodiments in which zeolites or other crystalline materials are used, they are conventionally formed with one or more binder components such as alumina, silica, silica-alumina, clay, titania and mixtures thereof. In certain embodiments, the catalyst particles have a pore volume in the range of about (cc/gm) 0.15-1.70, 0.15-1.50, 0.30-1.50 or 0.30-1.70; a specific surface area in the range of about (m$^2$/g) 100-900, 100-500, 100-450, 180-900, 180-500, 180-450, 200-900, 200-500 or 200-450; and an average pore diameter of at least about 30, 45 or 50, in certain embodiments in the range of about 30-80, 45-80, 50-80, 30-100, 45-100 or 50-100, 30-200, 45-200 or 50-200 angstrom units. The active component(s) are incorporated in an effective concentration, for instance, in the range of (wt % based on the mass of the active component(s) relative to the total mass of the catalysts including the support and binders) 1-40, 1-30, 1-10, 1-5, 2-40, 2-30, 2-10, 3-40, 3-30 or 3-10. Effective hydrocracking catalysts (second functional catalyst) include but are not limited to one or more active components selected from the group consisting of Ni, W, Mo, deposited or otherwise incorporated on a support formed of acidic alumina, silica alumina and/or zeolite. Examples include but are not limited to Ni/HY zeolite, Ni/alumina, W/alumina, Mo/zeolite, NiMo/alumina-USY zeolite, NiMo/silica alumina, or MoS$_2$/alumina.

In certain embodiments, the second functional catalyst and/or the catalyst support is prepared in accordance with U.S. Pat. No. 9,221,036 and its continuation U.S. Pat. No. 10,081,009 (jointly owned by the owner of the present application, and subject to a joint research agreement), which is incorporated herein by reference in its entirety. Such a support includes a modified zeolite support having one or more of Ti, Zr and/or Hf substituting the aluminum atoms constituting the zeolite framework thereof. For instance, the second functional catalyst effective for hydrocracking can include one or more active component carried on a support containing a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

A multi-functional catalyst used in the hydrodealkylation zone 30 can be one or more conventionally known, commercially available or future developed hydrogenation catalysts effective to maximize the both main functions, that is, a first function of conversion of polyaromatics, such as naphthalene, methylnaphthalene, anthracene, naphtheno-di-aromatics (three rings, one saturated and two aromatic), by selective hydrogenation into aromatic compounds with one benzene ring, and a second function of selective ring opening and hydrodealkylation. The selection, activity and form of the multi-functional catalyst can be determined based on factors including but not limited to operating conditions, selected reactor configuration, feedstock composition, and desired degree of conversion. The multi-functional catalyst generally includes first functional active components and second functional active components. For example, suitable first functional active components include a) metals or metal compounds (oxides, carbides or sulfides), for instance a metal selected from the Periodic Table of the Elements IUPAC Groups 6, 9, 10, 13 and/or 14, such as Mo, Co, Ir, Pd, Pt, Ni, W, Sn or Ga, and b) one or more second active components, for instance a metal, metal compound, non-metal such as P, or other non-metal compound. Suitable second functional active components are metals or metal compounds (oxides, carbides or sulfides) selected from the Periodic Table of the Elements IUPAC Groups 6, 7, 8, 9 and 10, such as NiMo or MoS$_2$.

One or more of each of the first and second functional active components of a multi-functional catalyst are typically deposited or otherwise incorporated on a catalyst support, which can be amorphous and/or structured, such as silica-alumina, silica, titania, titania-silica, titania-silicates, zeolites (including HY, beta, mordenite, ZSM-5, ZSM-12, ZSM-22, ZSM-11, MCM-22, MCM-56, or SSZ-26/33 zeolites), or similar crystalline materials to zeolites such as SAPO. The catalyst support(s) can be subjected to treatment whereby support properties such as pore volume, surface area, and average pore size are altered, such as by meso-structuring treatments which include one or more of desilication, de-alumination, steaming, acid leaching, and templated re-crystallization. In embodiments in which P is used, elemental form of P can be added and treated with H$_2$SO$_4$, whereby after treatment P remains in the structure of the catalyst. Combinations of active components can be composed of different particles/granules containing a single active metal species, or particles containing multiple active components. In embodiments in which zeolites or other crystalline materials are used, they are conventionally formed with one or more binder components such as alumina, silica, silica-alumina, clay, titania and mixtures thereof. In certain embodiments, the multi-functional catalyst particles have a pore volume in the range of about (cc/gm) 0.15-1.70, 0.15-1.50, 0.30-1.50 or 0.30-1.70; a specific surface area in the range of about (m2/g) 100-900, 100-500, 100-450, 180-900, 180-500, 180-450, 200-900, 200-500 or 200-450; and an average pore diameter of at least about 30, 45 or 50, in certain embodiments in the range of about 30-80, 45-80, 50-80, 30-100, 45-100 or 50-100, 30-200, 45-200 or 50-200 angstrom units. The active component(s) are incorporated in an effective concentration, for instance, in the range of (wt % based on the mass of the active component(s) relative to the total mass of the catalysts including the support and binders) 1-40, 1-30, 1-10, 1-5, 2-40, 2-30, 2-10, 3-40, 3-30 or 3-10. Effective multi-functional catalysts include but are not limited to one or more first functional active components selected from a) Mo, Co, Ir, Pd, Pt, Ni, W, Sn or Ga, and b) a non-metal such as P, and one or more second functional components such as Ni, W, Mo, NiMo or MoS$_2$, deposited or otherwise incorporated on a support formed of acidic alumina, silica alumina and/or zeolite. Examples include but are not limited to NiP/zeolite, MoP/alumina or Pd—Ni/zeolite (including HY zeolites).

In certain embodiments, the multi-functional catalyst and/or the catalyst support is prepared in accordance with U.S. Pat. No. 9,221,036 and its continuation U.S. Pat. No. 10,081,009 (jointly owned by the owner of the present application, and subject to a joint research agreement), which is incorporated herein by reference in its entirety. Such a support includes a modified zeolite support having one or more of Ti, Zr and/or Hf substituting the aluminum atoms constituting the zeolite framework thereof. For instance, the catalyst effective for hydrogenation can include one or more active component carried on a support containing a framework-substituted zeolite such as a ultra-stable Y-type zeolite, in which a part of aluminum atoms constituting a zeolite framework thereof is substituted one, two or all of Ti, Zr and Hf, for instance 0.1-5 mass % of each calculated on an oxide basis.

The transalkylation zone 66 can contain one or more fixed bed, fluidized bed, ebullated bed, slurry bed, moving bed, continuous stirred tank, or tubular reactors, in series or parallel arrangement, which is/are generally operated in the presence of hydrogen under conditions, and utilizes catalyst(s), effective for conversion of a portion of the C9 stream from the BTX splitting zone 56 to xylenes. In certain embodiments, multiple reactors can be provided in parallel in transalkylation zone 66 to facilitate catalyst replacement and/or regeneration. The transalkylation zone 66 can also be in fluid communication with a source of toluene to react with C9 via transalkylation reactions to produce additional xylenes. In certain embodiments toluene and benzene used to react with C9s can be from the BTX stream in the BTX splitting zone 56. In general, the transalkylation zone 66 includes an inlet in fluid communication with an outlet of the BTX splitting zone 56 discharging the C9 stream 62, which includes trimethyl-benzene, methylethylbenzene, and other C9 compounds. The transalkylation zone 66 also includes one or more outlets for discharging product streams of BTX and C9+ aromatics, shown as stream 70 and the light gases by-product including $C_1$-$C_4$ and hydrogen, stream 72. The transalkylation zone 66 is in fluid communication with a hydrogen gas stream 68, which can be passed to the reactors at one or more locations as is known, and can be derived from sources including recycled hydrogen from the integrated steam cracking unit (not shown), produced hydrogen 76 from the gas treatment zone 74, and hydrogen 90 from the reforming zone 80. Make-up hydrogen from another source (not shown) is also typically added.

The transalkylation zone 66 includes an effective reactor configuration with the requisite reaction vessel(s), feed heaters, heat exchangers, hot and/or cold separators, product fractionators, strippers, and/or other units to process the C9 stream from the BTX splitting zone 56. The transalkylation zone 66 operates in the presence of hydrogen, stream 68, under conditions effective to, and using catalyst effective to, maximize the transalkylation of unconverted trimethyl-benzene C9 aromatics and toluene to produce xylenes. The transalkylation zone 66 can also be configured to perform isomerization of mixed xylenes to promote production of para-xylene. The light gases stream 72 (which in certain embodiments can contain naphtha-range byproducts such as light naphtha) is in fluid communication with the gas treatment zone 74 for recovery of hydrogen and recovery of LPG and optionally naphtha-range components as additional feed to the steam cracking zone.

The C9 stream from the BTX splitting zone 56 and a hydrogen stream 68 are charged to the reactor of the transalkylation zone 66. The hydrogen stream contains an effective quantity of hydrogen to support the mixed xylene production from the feed, the reaction conditions, the selected catalysts and other factors, and can be any combination including hydrogen derived from the hydrogen producers within the integrated system and process, stream 76, and in certain embodiments 90, and in certain embodiments make-up hydrogen from another source.

Mixed xylenes that form part of the transalkylation reaction effluent stream 70 include the less commercially valuable m-xylene forms in greater amounts than either p- or o-xylenes because of thermodynamic equilibrium relationships between the three isomers. In certain embodiments separation of p-xylene is desired, for instance when market demand favors p-xylene over o-xylene and m-xylene. In some embodiments, the transalkylation reaction zone can also include an isomerization reactor to isomerize para-xylene-free mixed xylenes received from a para-xylene separator to reestablish the thermodynamic equilibrium of C8 aromatics (that is, xylene isomers) para-xylene. A para-xylene separator can separate and produce product streams of para-xylene and para-xylene-free mixed xylenes (that is, ortho- and meta-xylenes) from the transalkylation reaction effluent. In some embodiments, the para-xylene separator can be an adsorptive process or a crystallization process. In some embodiments, the para-xylene-free mixed xylenes stream produced by the para-xylene separator can be provided to the transalkylation reaction zone 66 for reestablishing a C8 aromatics thermodynamic equilibrium of xylene isomers and promoting formation of additional para-xylene.

Reaction conditions are set to maximize the conversion of the C9 stream from the BTX splitting zone 56 to xylenes by transalkylation reactions. In general, the operating conditions for the reactor of a suitable transalkylation reaction zone 66 include:

a reaction temperature (° C.) of from about 300-450, 300-420, 320-450 or 320-420;

an operating pressure (hydrogen partial pressure, kg/cm') of from about 5-30, 5-25, 5-20, 10-30, 10-25 or 10-20;

a hydrogen feed rate (SL/L) of from about 1-10, 1-8, 2-10 or 2-8; and a feed rate (liquid hourly space velocity, $h^{-1}$) of from about 1-10, 1-8, 2-10 or 2-8.

The catalyst used in the transalkylation zone 66 can be one or more conventionally known, commercially available or future developed transalkylation catalyst zone 66 are effective to maximize selective conversion of trimethyl-benzene and toluene into mixed xylenes. In certain embodiments the catalyst used in the transalkylation zone 66 are capable of converting a significant portion and, in some embodiments, all, of the trimethyl-benzene in the C9 aromatics stream to mixed xylenes under effective operating conditions. An appropriate, commercially available transalkylation catalyst can be used. The selection, activity and form of the transalkylation catalyst can be determined based on factors including but not limited to operating conditions, selected reactor configuration, feedstock composition, ratios of toluene to trimethyl-benzene, and desired degree of conversion. For example, suitable catalysts generally contain one or more active components selected from the group consisting of silicon, phosphorus, boron, magnesium, tin, titanium, zirconium, molybdenum, germanium, indium, lanthanum, cesium, and any oxide thereof. The active component is typically deposited or otherwise incorporated on a support such as a beta zeolite support catalyst support, which can be a zeolite material such as USY zeolite, NaHY zeolite, ZSM-12 zeolite, mesoporous surface area (MSA) zeolite, $Al_2O_3$ zeolite, beta zeolite, mordenite zeolite or silicate-1 zeolite.

Figure 7:
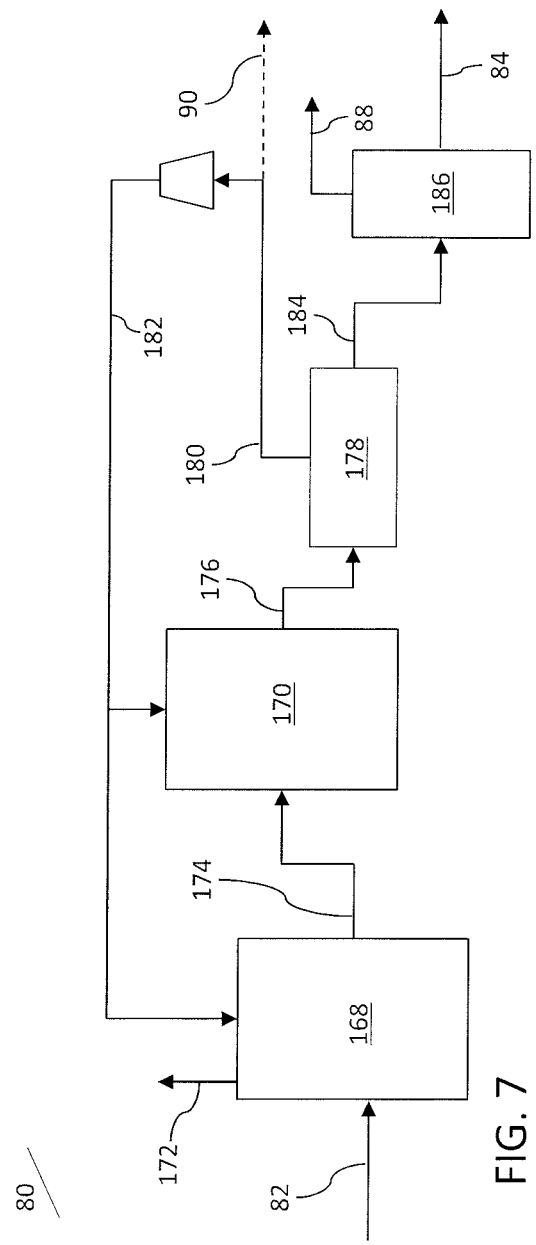
FIGS. 7, 8 and 9 schematically depict operation of a catalytic reforming zone for production reformate suitable as additional feed for BTX splitting in the embodiments of FIGS. 1 and 2.

The catalytic reforming zone 80 treats naphtha, typically hydrotreated naphtha, to produce a reformate stream 84. A schematic process flow diagram of a catalytic reforming zone 80 is shown in FIG. 7, and in certain embodiments combined with the units of FIG. 8. The catalytic reforming zone 80 can include a naphtha hydrotreating zone, and the catalytic reforming reaction zone. In certain embodiments the catalytic reforming zone also includes a reformate splitter and/or a benzene saturation unit. Product from the naphtha hydrotreating zone includes LPG and gases, and a hydrotreated naphtha product that is routed to a naphtha reformer. The naphtha reformer converts hydrotreated naphtha to reformate stream 84 that is passed to the BTX splitting zone 56. In certain embodiments, all or a portion of the reformate stream 84 can be used in a conventional manner, that is, as gasoline blending components.

The source of naphtha feed 82 can be from one or more of: naphtha-range components produced in one or more operations of the integrated process herein including the hydrodealkylation zone 30; naphtha from the initial feed 120 (which initial feed 120 can be crude oil) after a separator section (such as a distillation column) to separate the initial feed into three streams, a naphtha stream, a lighter than naphtha stream (boiling point<naphtha) and a heavier than naphtha stream (boiling point>naphtha), where the naphtha is all or part of stream 82 and the other streams can serve as the initial feed as described herein; and/or a sourced naphtha stream such as naphtha (straight run, treated or wild naphtha) obtained from outside of the refinery limits.

The reactions involved in catalytic reforming include hydrocracking, dehydrocyclization, dehydrogenation, isomerization, and to a lesser extent, demethylation and dealkylation. A particular hydrocarbon/naphtha feed molecule may undergo more than one category of reaction and/or may form more than one product. The hydrocarbon/naphtha feed composition, the impurities present therein, and the desired products will determine such process parameters as choice of catalyst(s), process type, and the like.

The reaction rate for conversion of naphthenes to aromatics favors low pressure, but such low pressure operations also promotes coke formation which deactivates the catalyst. Thus, with lower operating pressure the aromatics yield increases, but catalyst regeneration must occur more frequently. To maintain the desired lower operating pressure and also address coke formation, different methodologies are known. The general types of catalytic reforming process configurations differ in the manner in which the reforming catalyst is regenerated for removal of coke formed during reaction. Catalyst regeneration, which involves combusting the detrimental coke in the presence of oxygen, includes a semi-regenerative process, cyclic regeneration and continuous catalyst regeneration (CCR). Semi-regeneration is the simplest configuration, and the entire unit, including all reactors in the series is shutdown for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for essentially uninterrupted operation by catalyst removal, regeneration and replacement. While continuous catalyst regeneration configurations include the ability to increase the severity of the operating conditions due to higher catalyst activity, the associated capital investment is necessarily higher.

Referring to FIG. 7, a reforming zone 80 includes a naphtha hydrotreating zone 168 integrated with a catalytic reforming reaction zone 170 for the processing of a naphtha stream 82, to produce reformate stream 84 for aromatics recovery via the BTX splitting zone 56. In certain embodiments or in certain modes of operation, all or a portion of the reformate stream 84 can be used as a gasoline blend component. In certain embodiments, all, a substantial portion, a significant portion or a major portion of the reformate stream 84 is passed to the BTX splitting zone 56, and any remainder can be blended in a gasoline pool.

Naphtha hydrotreating occurs in the presence of an effective amount of hydrogen obtained from recycle within the naphtha hydrotreating zone 168 (not shown), recycle reformer hydrogen 172, and if necessary make-up hydrogen (not shown). A gas stream of effluent off-gases and LPG, stream 182, is recovered from the naphtha hydrotreating zone 168 and can be passed to the gas treatment zone 74, for instance as part of the stream 88, and/or can be integrated directly to a fuel gas system. In certain embodiments LPG is separately recovered from the naphtha hydrotreating zone 168 and is routed to the steam cracking zone 10.

The naphtha hydrotreating zone 168 is operated in the presence of hydrogen under conditions, and utilizes catalyst(s), effective for removal of a significant amount of the sulfur and other known contaminants. Accordingly, the naphtha hydrotreating zone 168 subjects feed to hydrotreating conditions to produce a hydrotreated straight run naphtha stream 174 effective as feed to the catalytic reforming reaction zone 170. As is known, the naphtha hydrotreating zone 168 operates with suitable catalysts and under conditions (temperature, pressure, hydrogen partial pressure, liquid hourly space velocity (LHSV), catalyst loading) that are effective to remove at least enough sulfur, nitrogen, olefins and other contaminants needed to meet requisite product specifications. Hydrotreating in conventional naphtha reforming systems generally occurs under relatively mild conditions that are effective to remove sulfur and nitrogen to requisite levels for catalytic reforming, for instance less than 0.5 ppmw of sulfur and nitrogen.

The hydrotreated naphtha stream 174 is passed to a catalytic reforming reaction zone 170. In certain embodiments, all, a substantial portion or a significant portion of the hydrotreated naphtha stream 174 is passed to the catalytic reforming reaction zone 170, and any remainder can be blended in a gasoline pool. As is known, the catalytic reforming reaction zone 170 operates with suitable catalysts and under conditions (temperature, pressure, LHSV, hydrogen to hydrocarbon molar ratio, catalyst loading) that are effective to carry out the desired degree of naphtha reforming. In general, the operating conditions for the catalytic reforming reaction zone 170 include:

a reaction temperature (° C.) of from about 400-560, 450-560, 400-530 or 450-530;

a hydrogen partial pressure ($kg/cm^2$) of from about 1-50, 1-40, 3-50 or 3-49; and a feed rate (liquid hourly space velocity, $h^{-1}$) of from about 0.5-10, 0.5-5, 0.5-3, 1-10, 1-5 or 1-3.

In the catalytic reforming process, paraffins and naphthenes are restructured to produce isomerized paraffins and aromatics of relatively higher octane numbers. The catalytic reforming converts low octane n-paraffins to i-paraffins and naphthenes. Naphthenes are converted to higher octane aromatics. The aromatics are left essentially unchanged or some may be hydrogenated to form naphthenes due to reverse reactions taking place in the presence of hydrogen.

A reactor effluent 176, containing hot reformate and hydrogen, is cooled and passed to separator 178 for recovery of hydrogen stream 180 and a separator bottoms stream 184. The hydrogen stream 180 is split into a portion 182 which is compressed and recycled back to the reformer reactors, and in certain embodiments into the excess hydrogen stream 90. The separator bottoms stream 184 is passed to a stabilizer column 186 to produce the light end stream 88 and the reformate stream 84. The light end stream 88 is recovered and can be routed to the steam cracking zone 10 and/or gas treatment zone 74 as described herein.

Figure 9:
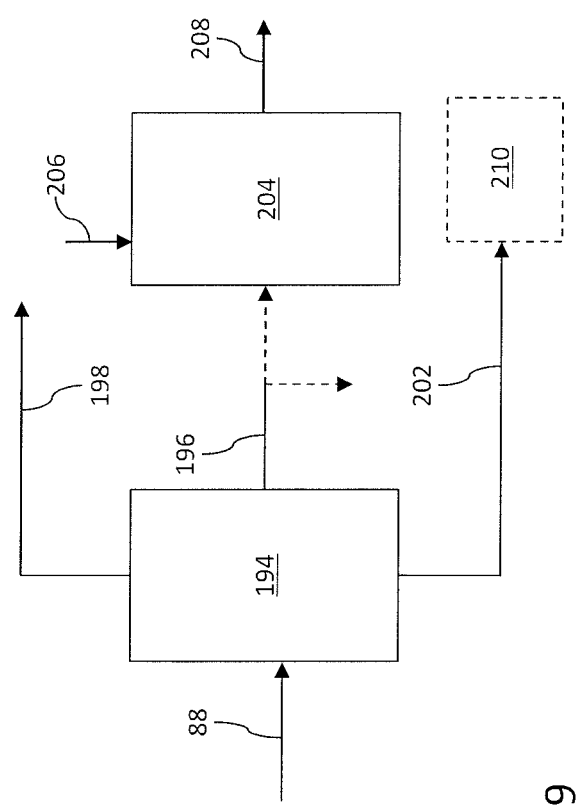

The net hydrogen stream 90 can be recovered from the reforming zone 80, which comprises excess hydrogen passed to other hydrogen users including: those within the catalytic reforming zone 80 such as the naphtha hydrotreating zone 168 and in certain embodiments a benzene saturation unit 204 shown in FIG. 9; and/or other to hydrogen users in the integrated process and system.

Figure 8:
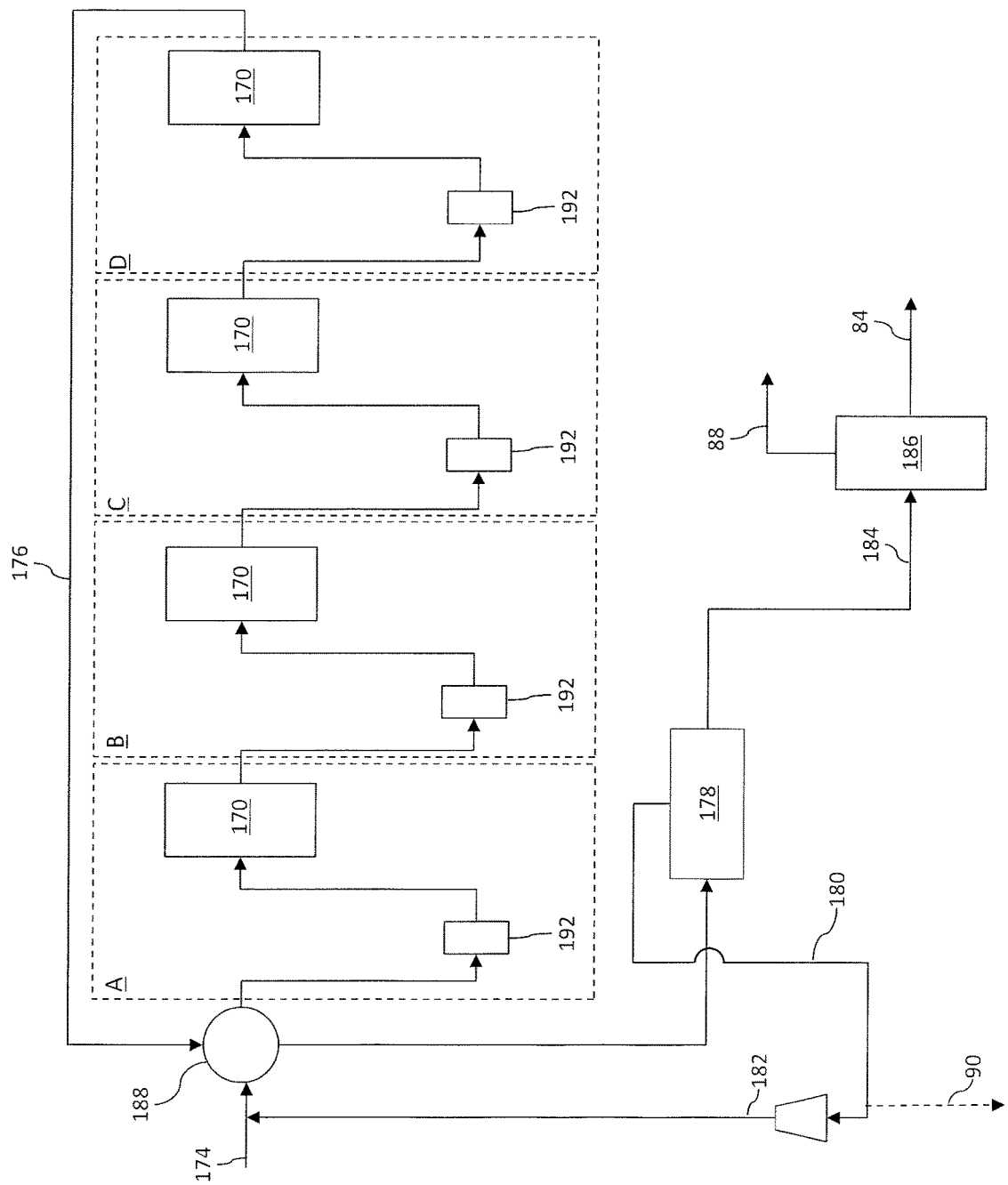

Referring to FIG. 8, another embodiment of a catalytic reforming zone 80 is schematically depicted. A series of reactors 170 are provided. A feedstock, hydrotreated naphtha 174, is heat exchanged via exchanger 188 with a hot reformate stream 176 to increase the temperature of the feed. The heated feedstock is treated in a series of reaction zones containing reformer reactors 170, shown in the exemplary embodiment as zones A-D, although fewer or more zones can be used. The hot reformate stream 176 contains hot product hydrogen and reformate. The reforming reactions are endothermic resulting in the cooling of reactants and products, requiring heating of effluent, typically by direct-fired furnaces 192, prior to charging as feed to a subsequent reforming reactor 170. As a result of the very high reaction temperatures, catalyst particles are deactivated by the formation of coke on the catalyst which reduces the available surface area and active sites for contacting the reactants. Hot product hydrogen and reformate stream 176 passes through the heat exchanger and then to separator 178 for recovery of hydrogen stream 180 and a separator bottoms stream 184. Recovered hydrogen stream 180 is split with a portion 182 compressed and recycled back to the reformer reactors, and excess hydrogen 90 is recovered. The separator bottoms stream 184 is sent to a stabilizer column 186 to produce the light end stream 88 and a reformate stream 84.

In certain optional embodiments, and with reference to FIG. 9, to increase production of gasoline fuel components, the reformate stream is passed to separation and hydrogenation steps to reduce the total benzene content. For instance, instead of passing all or a portion of the total reformate stream 84 to the BTX splitting zone 56, all or a portion can be passed to a reformate splitter 194 and separated into one or more relatively benzene-rich fractions 196 and one or more relatively benzene-lean fractions 198 and 202. Typically, the relatively benzene-rich middle fraction 196, known as a "benzene heart cut," comprises about 10-20 vol % of the total reformate and contains about 20-30 vol % benzene. In contrast, the relatively benzene-lean heavy reformate bottom fraction 202 comprises about 40-80 V % of the total reformate and has a benzene content generally in the range of from about 0.3-1 vol %. The light reformate top fraction 198 which includes about 10-25 vol % of the total reformate, contains about 5-30 vol % benzene and is recovered or blended with other product pools.

The heart cut fraction 196, which contains a majority of the benzene content of total reformate stream 84, can be passed to a hydrogenation unit 204, also referred to as a benzene saturation unit, or directly to the BTX splitting zone 56. Hydrogenation reactions occur in the presence of a predetermined amount of hydrogen gas 206 for conversion reactions including conversion of benzene to cyclohexane, and for the production of a benzene-lean and in certain embodiments an essentially benzene-free, gasoline blending component 208. The benzene saturation unit typically contains an effective quantity of catalyst having a suitable level of active materials possessing hydrogenation functionality, including but not limited to a metal selected from the Periodic Table of the Elements IUPAC Groups 9 or 10, such as nickel, platinum, supported on an alumina substrate.

All or a portion of the benzene-lean blending component 208 can be mixed with the remaining gasoline pool constituents including the benzene-lean heavy reformate bottom fraction 202. For instance, when blended with the heavy reformate fraction 202 which can contain up to 1 vol % benzene, a final gasoline product can be recovered which contains less than about 1 vol % benzene. Further, all or a portion of benzene-lean blending component 208 can be routed to the steam cracking zone 10. All of a portion of the light benzene lean fraction 198 can be routed to a gasoline pool or to the steam cracking zone 10. All or a portion of the heavy benzene lean fraction 202 can be routed to the BTX splitting zone 56 or to the steam cracking zone 10, or passed to a gasoline pool 210 without further processing.

The method and system of the present invention have been described above and in the attached drawings; however, modifications will be apparent to those of ordinary skill in the art and the scope of protection for the invention is to be defined by the claims that follow.

The invention claimed is:

1. An integrated process comprising:
   providing a treated crude oil as a steam cracking feed by
      hydroprocessing a crude oil stream as a hydroprocessed crude oil steam cracking feed,
      hydroprocessing a crude oil stream as a hydroprocessed crude oil, and removing vacuum residue components from said hydroprocessed crude oil, as a bottomless crude oil steam cracking feed,
      hydroprocessing a crude oil stream as a hydroprocessed crude oil, and removing components in and below a naphtha or light naphtha range, as a topped crude oil steam cracking feed, or
      subjecting a hydroprocessed crude oil, a bottomless crude oil or a topped crude oil to solvent deasphalting to recover deasphalted oil as a deasphalted oil steam cracking feed;
   steam cracking said steam cracking feed in a steam cracking zone to produce olefins, pyrolysis gasoline and refractory PFO, wherein said refractory PFO comprises at least 40 wt % of polyaromatics having three or more aromatic rings including triaromatics, naphtheno-triaromatics, tetraaromatics, penta-aromatics and heavier poly-aromatics including asphaltenes and coke;
   optionally separating the refractory PFO into at least a first stream containing C9+ aromatics compounds with one benzene ring and C10+ aromatic compounds, and a second stream containing C20+ polyaromatic compounds;
   reacting all or a portion of the refractory PFO, or all or a portion of the first stream containing C9+ aromatics compounds with one benzene ring and C10+ aromatic compounds, using conditions, including hydrogen, effective for conversion of polyaromatics compounds contained in the refractory PFO into aromatic compounds with one benzene ring, selective ring opening, and dealkylation, to produce reaction effluent including LPG and a hydrodealkylated BTX+stream, wherein reacting all or a portion of the refractory PFO, or all or a portion of the first stream containing C9+ aromatics compounds with one benzene ring and C10+ aromatic compounds, is in the presence of an effective quantity of a first functional catalyst and a second functional catalyst, or is in the presence of an effective quantity of a multi-functional catalyst,
      wherein the first functional catalyst and the second functional catalyst are provided in multiple beds of the different functional catalysts in a reaction vessel, in multiple reaction vessels in series having the different functional catalysts, or as a mixture of the different functional catalysts in a reaction vessel, wherein the first functional catalyst is effective to promote conversion of polyaromatics including naphthalene, methylnaphthalene, anthracene and naphtheno-diaromatics by selective hydrogenation into aromatic compounds with one benzene ring, and comprises one or more first active components selected from the group consisting of Mo, Co, Ir, Pd, Pt, Ni, W, Sn and Ga, and optionally a second active component P, deposited or otherwise incorporated on a support comprising alumina and/or amorphous silica alumina, and wherein the second functional catalyst is effective to promote selective ring opening and hydrodealkylation, and comprises one or more active components selected from the group consisting of Ni, W and Mo, deposited or otherwise incorporated on a support comprising acidic alumina, silica alumina and/or zeolite, or wherein the multi-functional catalyst is provided in a reaction vessel, wherein the multi-functional catalyst is effective to promote conversion of polyaromatics including naphthalene, methylnaphthalene, anthracene and naphtheno-diaromatics by selective hydrogenation into aromatic compounds with one benzene ring as a first function, and selective ring opening and hydrodealkylation as a second function, wherein the multi-functional catalyst comprises one or more first functional active components selected from the group consisting of Mo, Co, Ir, Pd, Pt, Ni, W, Sn and Ga, optionally in combination with P, and one or more second functional components selected from the group consisting of Ni, W and Mo, wherein the first functional active components and the second functional active components are deposited or otherwise incorporated on a support comprising acidic alumina, silica alumina and/or zeolite;

separating LPG from the reaction effluent;

subjecting a naphtha feed to catalytic reforming to produce a reformate stream; and separating at least a portion of the reformate stream and at least a portion of the hydrodealkylated BTX+ stream into BTX compounds.

2. The process as in claim 1, wherein all or a portion of the C20+ polyaromatic compounds are separated as the second stream prior to reacting all or a portion of the first stream to produce the hydrodealkylated BTX+ stream, and wherein reaction conditions comprise a reaction temperature (° C.) in the range of about 300-500, a reaction pressure (hydrogen partial pressure, kg/cm$^2$) in the range of about 3-25, a hydrogen feed rate (standard liters per liter of hydrocarbon feed, SLt/Lt) in the range of about 1-25, and a LHSV in the range of about 0.1-8.

3. The process as in claim 1, wherein the refractory PFO stream or the second stream contains C20+ polyaromatic compounds, and wherein:

reaction conditions to produce a hydrodealkylated BTX+ stream comprise a reaction temperature (° C.) in the range of about 300-550, a reaction pressure (hydrogen partial pressure, kg/cm$^2$) in the range of about 3-30, a hydrogen feed rate (standard liters per liter of hydrocarbon feed, SLt/Lt) in the range of about 1-30, and a LHSV in the range of about 0.1-10.

4. The process as in claim 1, wherein the separated LPG stream is treated and passed to the steam cracking zone.

5. The process as in claim 1, wherein separating at least a portion of the hydrodealkylated BTX+ stream into BTX compounds further comprises separating C9 aromatic compounds, and wherein the process further comprises transalkylating the separated C9 aromatic compounds to produce a transalkylated effluent containing additional BTX compounds and light gases, wherein light gases from transalkylating are treated and one or more LPG streams are recovered, and wherein the one or more LPG streams are passed to the steam cracking zone as additional steam cracking feed.

6. The process as in claim 1, wherein separating at least a portion of the hydrodealkylated BTX+ stream into BTX compounds further comprises separating C9 aromatic compounds, and wherein the process further comprises transalkylating the separated C9 aromatic compounds to produce a transalkylated effluent containing additional BTX compounds, further comprising separating naphtha-range hydrocarbon compounds from the transalkylated effluent prior to separation into BTX compounds, and passing all or a portion of said naphtha-range hydrocarbon compounds to the steam cracking zone as additional steam cracking feed, or wherein all or a portion of said naphtha-range hydrocarbon compounds comprise at least a portion of the naphtha feed to catalytic reforming.

7. The process as in claim 1, wherein separating at least a portion of the hydrodealkylated BTX+ stream into BTX compounds further comprises separating C9 aromatic compounds, and wherein the process further comprises transalkylating the separated C9 aromatic compounds to produce a transalkylated effluent containing additional BTX compounds, further comprising recovering a raffinate stream comprising non-aromatic compounds from the transalkylated effluent, and passing all or a portion of said raffinate stream to the steam cracking zone as additional steam cracking feed, wherein recovering a raffinate stream is by aromatics extraction to separate the hydrodealkylated BTX+ stream into the raffinate stream and an extract stream comprising aromatic compounds, and wherein the extract stream is separated into the BTX compounds.

8. The process as in claim 1, wherein separating the hydrodealkylated BTX+ stream into BTX compounds further comprises separating C10+ compounds from the hydrodealkylated BTX+ stream, and wherein at least a portion of the separated C10+ compounds are recycled to the step of reacting with reacting all or a portion of the refractory PFO, or all or a portion of the first stream containing C9+ aromatics compounds with one benzene ring and C10+ aromatic compounds.

9. The process as in claim 1, wherein separating the hydrodealkylated BTX+ stream into BTX compounds further comprises separating C10+ compounds from the hydrodealkylated BTX+ stream, and wherein at least a portion of the separated C10+ compounds are subjected to hydroprocessing with the crude oil stream.

10. The process as in claim 1, further comprising separating naphtha-range hydrocarbon compounds from the hydrodealkylated BTX+ stream prior to separation into BTX compounds, and passing all or a portion of said naphtha-range hydrocarbon compounds to the steam cracking zone as additional steam cracking feed.

11. The process as in claim 1, further comprising separating naphtha-range hydrocarbon compounds from the hydrodealkylated BTX+ stream prior to separation into BTX compounds, wherein all or a portion of said naphtha-range hydrocarbon compounds comprise at least a portion of the naphtha feed to catalytic reforming.

12. The process as in claim 1, further comprising separating at least a portion of the hydrodealkylated BTX+ stream into BTX compounds includes recovering a raffinate stream comprising non-aromatic compounds, and passing all or a portion of said raffinate stream to the steam cracking zone as additional steam cracking feed.

13. The process as in claim 12, wherein recovering a raffinate stream is by aromatics extraction to separate the hydrodealkylated BTX+ stream into the raffinate stream and an extract stream comprising aromatic compounds, and wherein the extract stream is separated into the BTX compounds.

14. The process as in claim 1, further comprising separating at least a portion of the reformate stream into BTX compounds includes recovering a raffinate stream comprising non-aromatic compounds, and passing all or a portion of said raffinate stream to the steam cracking zone as additional steam cracking feed.

15. The process as in claim 14, wherein recovering a raffinate stream is by aromatics extraction to separate the reformate stream into the raffinate stream and an extract stream comprising aromatic compounds, and wherein the extract stream is separated into the BTX compounds.

16. The process as in claim 1,
wherein reacting all or a portion of the refractory PFO, or all or a portion of the first stream containing C9+ aromatics compounds with one benzene ring and C10+ aromatic compounds, is in the presence of an effective quantity of a first functional catalyst and a second functional catalyst; and
wherein the first functional catalyst comprises one or more first active components selected from the group consisting of Mo, Co, Pd, Ni and Sn, and optionally a second active component P, deposited or otherwise incorporated on a support comprising alumina and/or amorphous silica alumina, and wherein the second functional catalyst comprises one or more active components selected from the group consisting of Ni, W and Mo, deposited or otherwise incorporated on a support comprising zeolite.

17. The process as in claim 1,
wherein reacting all or a portion of the refractory PFO, or all or a portion of the first stream containing C9+ aromatics compounds with one benzene ring and C10+ aromatic compounds, is in the presence of an effective quantity of a multi-functional catalyst; and
wherein the multi-functional catalyst comprises one or more first functional active components selected from the group consisting of Mo, Co, Pd, Ni and Sn, optionally in combination with P, and one or more second functional components selected from the group consisting of Ni, W and Mo, wherein the first functional active components and the second functional active components are deposited or otherwise incorporated on a support comprising acidic alumina, silica alumina and/or zeolite.

18. The process as in claim 1, wherein providing the treated crude oil is by hydroprocessing a crude oil stream as a hydroprocessed crude oil steam cracking feed.

19. The process as in claim 1, wherein providing the treated crude oil is by hydroprocessing a crude oil stream as a hydroprocessed crude oil, and removing vacuum residue components from said hydroprocessed crude oil, as a bottomless crude oil steam cracking feed.

20. The process as in claim 1, wherein providing the treated crude oil is by hydroprocessing a crude oil stream as a hydroprocessed crude oil, and removing components in and below a naphtha or light naphtha range, as a topped crude oil steam cracking feed.

21. The process as in claim 1, wherein providing the steam cracking feed is by
hydroprocessing a crude oil stream as a hydroprocessed crude oil steam cracking feed,
hydroprocessing a crude oil stream as a hydroprocessed crude oil, and removing vacuum residue components from said hydroprocessed crude oil, as a bottomless crude oil steam cracking feed, or
hydroprocessing a crude oil stream as a hydroprocessed crude oil, and removing components in and below a naphtha or light naphtha range, as a topped crude oil steam cracking feed; and
subjecting the hydroprocessed crude oil, the bottomless crude oil or the topped crude oil to solvent deasphalting to recover deasphalted oil as a deasphalted oil steam cracking feed.

* * * * *